US008485048B2

(12) United States Patent
Bushey et al.

(10) Patent No.: US 8,485,048 B2
(45) Date of Patent: Jul. 16, 2013

(54) TORQUE TRANSFER COUPLING

(75) Inventors: John A. Bushey, Eden Prairie, MN (US); Martin M. Gram, Minneapolis, MN (US); Jay S. Warner, Annandale, MN (US); Zdenek Mestenhauser, Minneapolis, MN (US); Robert J. Orange, Minneapolis, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 209 days.

(21) Appl. No.: 12/848,706

(22) Filed: Aug. 2, 2010

(65) Prior Publication Data
US 2011/0028224 A1 Feb. 3, 2011

Related U.S. Application Data

(60) Provisional application No. 61/230,318, filed on Jul. 31, 2009, provisional application No. 61/252,884, filed on Oct. 19, 2009, provisional application No. 61/306,160, filed on Feb. 19, 2010.

(51) Int. Cl.
*G01L 3/00* (2006.01)
(52) U.S. Cl.
USPC .......................................... 73/862.08; 73/856
(58) Field of Classification Search
USPC ....................................... 73/760, 856, 862.08
See application file for complete search history.

(56) References Cited

U.S. PATENT DOCUMENTS

| 2,180,363 | A | 12/1937 | Horger |
| 2,218,463 | A | 10/1940 | Bennett |
| 2,623,384 | A | 7/1951 | Pigott |
| 2,872,805 | A | 5/1959 | Cochran, Jr. |
| 3,087,330 | A | 4/1963 | Metzmeier |
| 3,115,034 | A | 12/1963 | De Hart |
| 3,154,983 | A | 11/1964 | Firth |

(Continued)

FOREIGN PATENT DOCUMENTS

| DE | 10260000 | 7/2004 |
| EP | 0239264 A2 | 9/1987 |

(Continued)

OTHER PUBLICATIONS

Allen Clark, Vibration Technologies No. 4, Pioneering Structural Control Systems for Two High-Rise Buildings, Sep. 2001, pp. 30-35.

(Continued)

*Primary Examiner* — Max Noori
(74) *Attorney, Agent, or Firm* — Steven M. Koehler; Westman, Champlin & Kelly, P.A.

(57) ABSTRACT

A torque transfer coupling includes a shaft and a first second set of hydraulic devices. Each hydraulic device of the first set of hydraulic devices has a first end operably connected to a first end of the shaft, wherein the hydraulic devices of the first set of hydraulic devices are disposed about an axis of the shaft. Each hydraulic device of the second set of hydraulic devices has a first end operably connected to a second end of the shaft, and wherein the hydraulic devices of the second set of hydraulic devices are disposed about the axis of the shaft. Each hydraulic device can include a piston and cylinder assembly wherein extension and retraction of each piston of each hydraulic device is generally tangential to a portion of a circle encircling the shaft.

26 Claims, 38 Drawing Sheets

U.S. PATENT DOCUMENTS

| | | | |
|---|---|---|---|
| 3,279,244 | A | 10/1966 | Emmerling |
| 3,290,926 | A | 12/1966 | Montano |
| 3,298,224 | A | 1/1967 | Birchall |
| 3,354,709 | A | 11/1967 | Wiggermann |
| 3,486,051 | A | 12/1969 | Anson |
| 3,518,466 | A | 6/1970 | Bunner |
| 3,580,649 | A | 5/1971 | Araki et al. |
| 3,624,435 | A | 11/1971 | Bunner |
| 3,713,330 | A | 1/1973 | Lentz |
| 3,797,304 | A | 3/1974 | Klinger |
| 3,996,875 | A | 12/1976 | Isenberg, Jr. |
| 4,346,946 | A | 8/1982 | Maruyama |
| 4,593,773 | A | 6/1986 | Skeie |
| 4,711,124 | A | 12/1987 | Cagle |
| 5,003,829 | A | 4/1991 | DeConti |
| 5,083,453 | A | 1/1992 | Daley |
| 5,226,308 | A | 7/1993 | Gibson |
| 5,241,856 | A | 9/1993 | Petersen et al. |
| 5,404,759 | A | 4/1995 | Santopietro |
| 5,472,285 | A * | 12/1995 | Kjellqvist ............ 384/556 |
| 6,170,326 | B1 | 1/2001 | Juranitch |
| 6,182,515 | B1 | 2/2001 | Juranitch |
| 6,358,174 | B1 * | 3/2002 | Folsom et al. ............ 475/72 |
| 6,441,508 | B1 | 8/2002 | Hylton |
| 6,523,422 | B1 | 2/2003 | Juranitch |
| 6,612,163 | B2 | 9/2003 | Kamiyama |
| 6,640,638 | B1 | 11/2003 | Haeg |
| 6,662,669 | B2 | 12/2003 | Juranitch |
| 6,772,644 | B2 | 8/2004 | Juranitch |
| 6,776,048 | B2 | 8/2004 | Corrias |
| 6,938,500 | B2 | 9/2005 | Beaman |
| 6,954,685 | B2 | 10/2005 | Altieri et al. |
| 7,017,426 | B2 | 3/2006 | Juranitch |
| 7,080,565 | B2 | 7/2006 | Delair |
| 7,100,546 | B2 * | 9/2006 | Sorochkin et al. ......... 123/46 R |
| 7,117,948 | B2 * | 10/2006 | Mazzella et al. ............. 166/379 |
| 7,178,406 | B2 | 2/2007 | Gonzalez et al. |
| 7,204,161 | B2 | 4/2007 | Juranitch |
| 7,231,282 | B2 | 6/2007 | Schubert |
| 7,235,996 | B2 | 6/2007 | Middendorf |
| 7,282,807 | B2 | 10/2007 | Hornemann |
| 7,389,162 | B2 | 6/2008 | Altieri |
| 7,617,741 | B1 | 11/2009 | Lowe-Wylde |
| 7,631,564 | B1 | 12/2009 | Sihler |
| 2003/0188949 | A1 * | 10/2003 | Porter ............ 192/103 F |
| 2006/0037402 | A1 | 2/2006 | Musial |
| 2006/0070461 | A1 | 4/2006 | Delair |
| 2007/0039401 | A1 | 2/2007 | Isono |
| 2009/0107255 | A1 | 4/2009 | Jensen |
| 2009/0107256 | A1 | 4/2009 | Jensen |
| 2009/0173148 | A1 | 7/2009 | Jensen |
| 2009/0223307 | A1 | 9/2009 | Staedler |
| 2009/0301224 | A1 | 12/2009 | Sihler |
| 2009/0320631 | A1 | 12/2009 | Urzelai Iribarren |
| 2011/0023629 | A1 | 2/2011 | Bushey |

FOREIGN PATENT DOCUMENTS

| | | |
|---|---|---|
| JP | 3238376 | 10/1991 |
| WO | WO2007140788 A2 | 12/2007 |
| WO | WO2007140789 A1 | 12/2007 |
| WO | WO2007144003 A2 | 12/2007 |
| WO | WO2007144003 A3 | 12/2007 |

OTHER PUBLICATIONS

MTS Energy Solutions, Wind Turbine Drive-train Force and Moment Test System, 20 MW, Apr. 2010, pp. 1-4.
Wind Turbine Test Laboratory, Wind Institute, date unknown.
MTS Product Specification, Series 270 Hydraulic Slide Bearings, 1978, pp. 1-8.
National Renewable Energy Laboratory, National Wind Technology Center Dynamometer Upgrade, Mar. 2010.
Office Action for U.S. Appl. No. 12/848,714, filed Aug. 2, 2010, mailed Jun. 1, 2012, pp. 1-5.
Notice of Allowance for U.S. Appl. No. 12/848,714, filed Aug. 2, 2010, mailed Oct. 16, 2012, pp. 1-7.
Written Opinion and official Search Report of the European Patent Office in counterpart foreign application No. PCT/US2010/044113 filed Aug. 2, 2010.

* cited by examiner

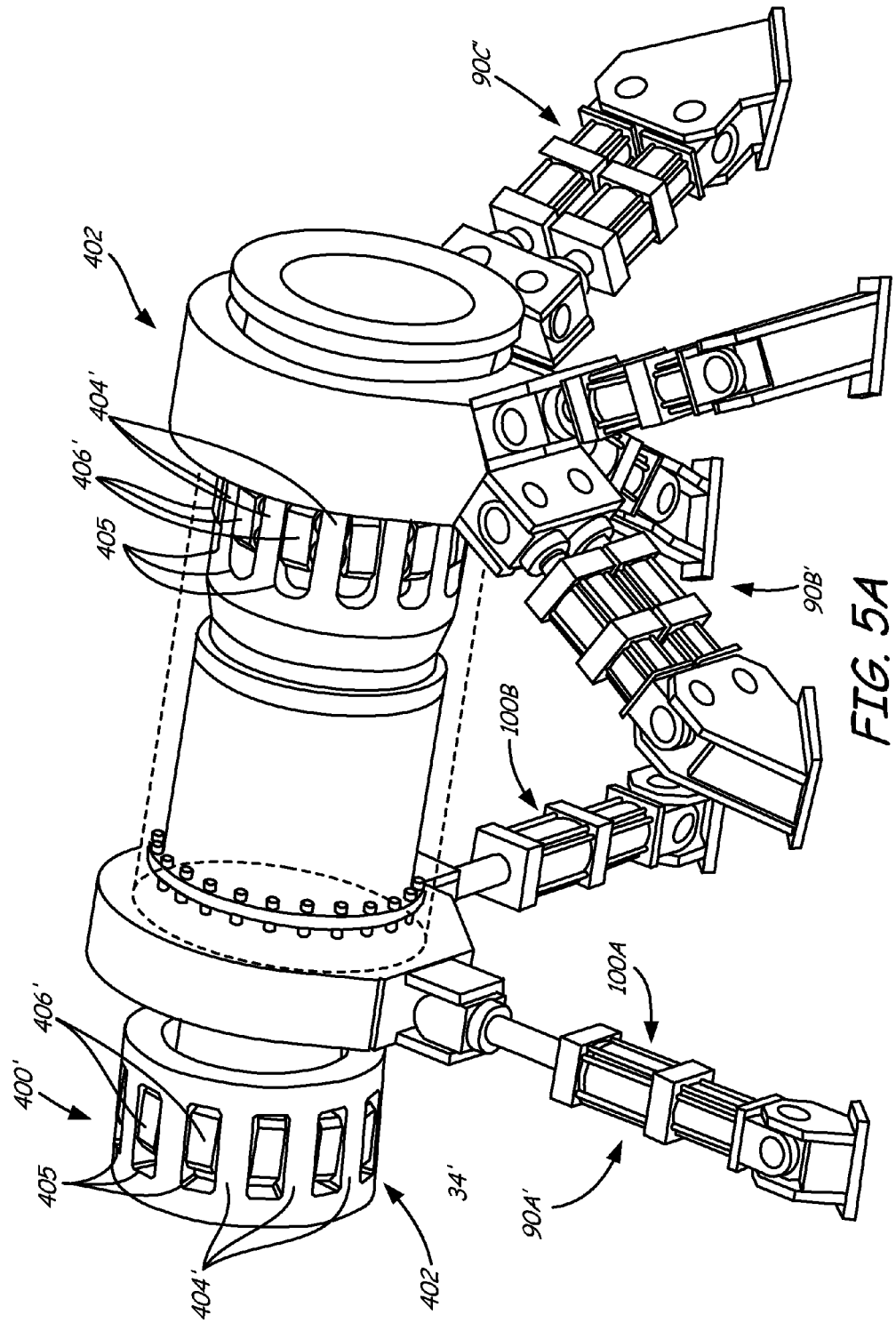

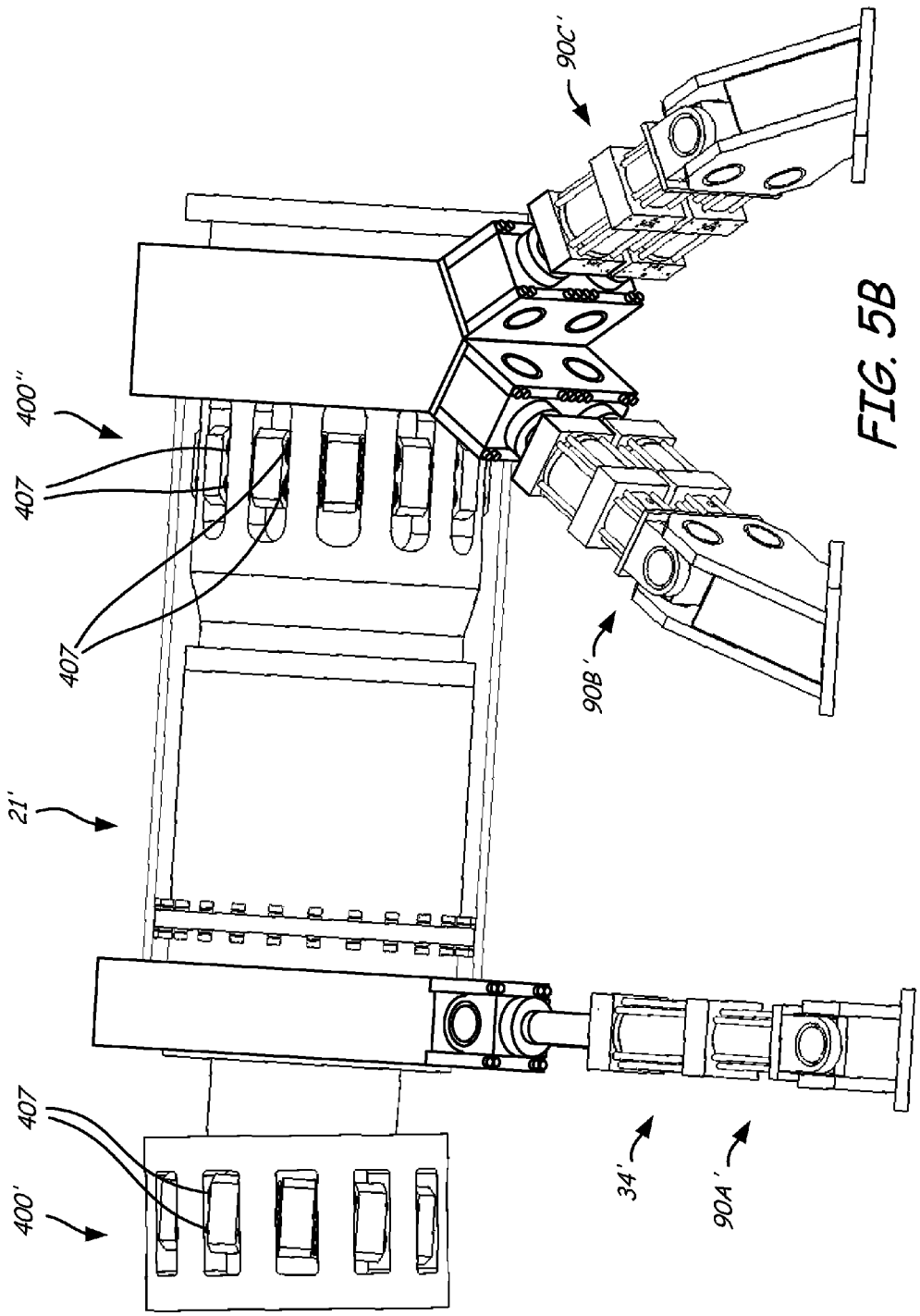

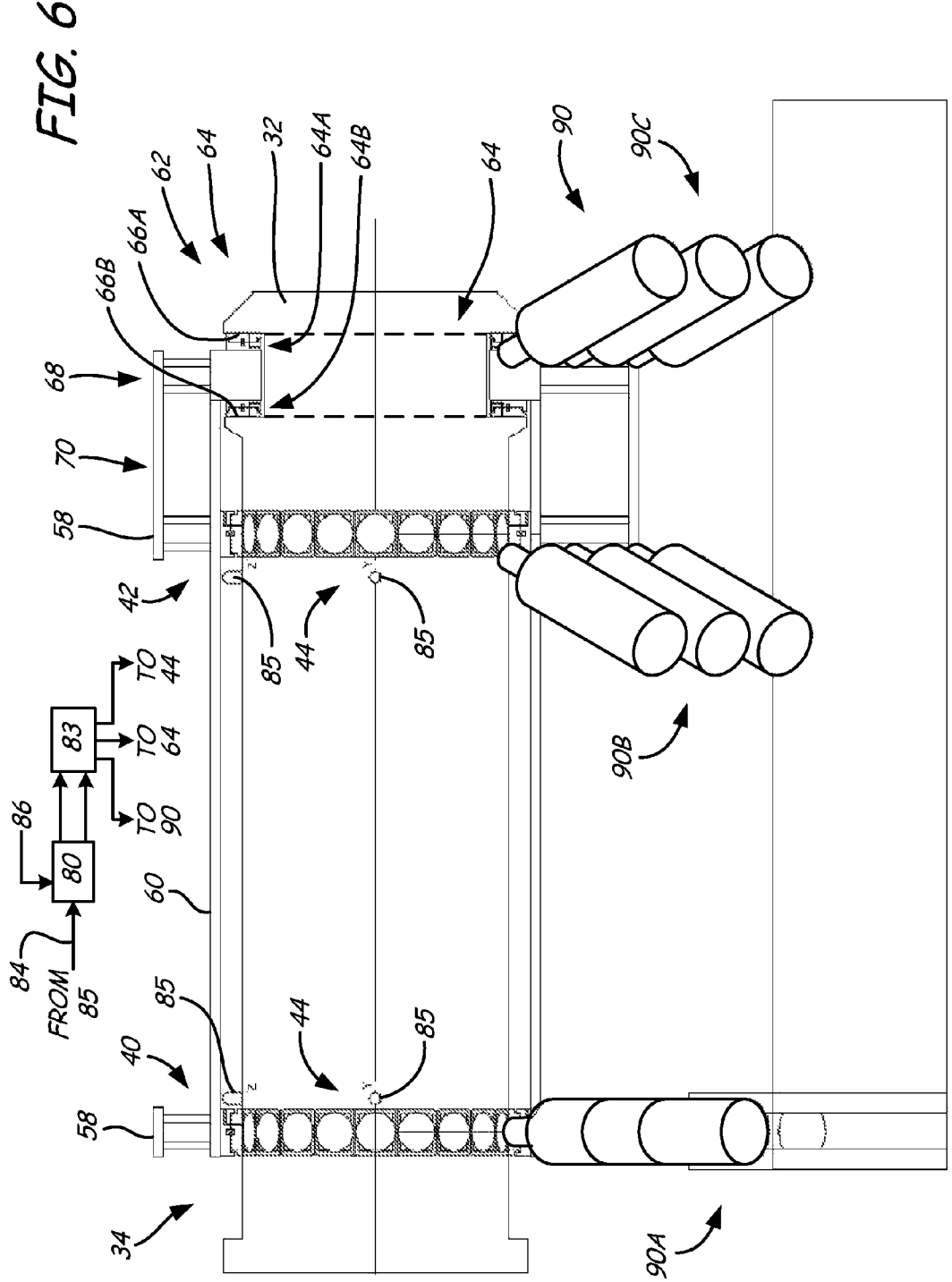

TORQUE TRANSFER COUPLING

CROSS-REFERENCE TO RELATED APPLICATIONS

The present application claims the benefit of U.S. Provisional Patent Application Ser. No. 61/230,318, filed Jul. 31, 2009, U.S. Provisional Patent Application Ser. No. 61/252,884, filed Oct. 19, 2009, and U.S. Provisional Patent Application Ser. No. 61/306,160, filed Feb. 19, 2010, all of which are hereby incorporated reference in their entirety. Incorporated herein is also US patent application entitled "WIND TURBINE DRIVE TRAIN TEST ASSEMBLY" having Ser. No. 12/848,714 and filed even date herewith.

BACKGROUND

The discussion below is merely provided for general background information and is not intended to be used as an aid in determining the scope of the claimed subject matter.

FIG. 1 schematically illustrates a wind turbine assembly 10 and a hub coordinate system used to define forces and moments experienced by the wind turbine assembly 10. The wind turbine assembly 10 will be subjected to various loads (forces and moments) when in operation, for example but not limited to a difference in wind speeds from wind above the wind turbine assembly and wind closer to the ground/water surface as well as various forms of wind gusts. The forces and moments can be defined with respect to three orthogonal axes (X, Y and Z) as an axial force $F_X$, radial forces $F_Y$, $F_Z$, shaft torque $M_X$, and moments about radial axes orthogonal to the shaft axis, i.e. $M_Y$, $M_Z$. These loads typically are of different magnitudes and different frequencies, but are applied simultaneously to the wind turbine assembly 10.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

One embodiment of the invention is a torque transfer coupling. The torque transfer coupling includes a shaft and a first second set of hydraulic devices. Each hydraulic device of the first set of hydraulic devices has a first end operably connected to a first end of the shaft, wherein the hydraulic devices of the first set of hydraulic devices are disposed about an axis of the shaft. Each hydraulic device of the second set of hydraulic devices has a first end operably connected to a second end of the shaft, and wherein the hydraulic devices of the second set of hydraulic devices are disposed about the axis of the shaft. Each hydraulic device can include a piston and cylinder assembly wherein extension and retraction of each piston of each hydraulic device is generally tangential to a portion of a circle encircling the shaft.

In one embodiment, the torque transfer coupling further includes a first member coupled to the first end of the shaft and a second member coupled to the second end of the shaft, wherein each of an end of the first member, an end of the second member, the first end of the shaft and the second end of the shaft include axially extending surfaces disposed circumferentially about a respective axis of rotation. The surfaces of the first end of the shaft are disposed between surfaces of the first member and wherein each hydraulic device of the first set of hydraulic devices is disposed between opposed facing surfaces of the first member and the first end of the input shaft, and wherein the surfaces of the second end of the shaft are disposed between surfaces of the second member and wherein each hydraulic device of the second set of hydraulic devices is disposed between opposed facing surfaces of the second member and the second end of the input shaft. If desired, axially extending surfaces are formed from slots disposed circumferentially about one of the first end of the shaft and the end of the first member, and likewise about one of the second end of the shaft and the end of the second member.

In one embodiment, each of the hydraulic devices comprises a hydraulic bearing assembly. In another embodiment, each of the hydraulic devices is single acting having extension under pressure in one direction. In such a case, if desired, successive hydraulic devices of each of the first set of hydraulic devices and the second set of hydraulic devices operate in opposed directions. In another embodiment, each of the hydraulic devices is double acting having extension and retraction under pressure in opposed directions.

If desired, the torque transfer coupling can comprise an element configured to limit axial displacement of the first end of the shaft from the end of the first member.

A power source can be configured to provide fluid to operate each of the hydraulic devices, while a controller can be configured to control the power source. If desired, the controller is configured to operate the hydraulic devices to control stiffness and/or damping of the torque transfer coupling.

In another embodiment of the invention, a method of transferring torque from a first element to a second element is provided. The method includes connecting a first set of hydraulic devices to the first element and a shaft, wherein each hydraulic device of the first set of hydraulic devices has a first end operably connected to a first end of the shaft and has a second end operably connected to the first element, wherein the hydraulic devices of the first set of hydraulic devices are disposed about an axis of the shaft; connecting a second set of hydraulic devices to the second element and the shaft, wherein each hydraulic device of the second set of hydraulic devices has a first end operably connected to a second end of the shaft and has a second end operably connected to the second element, wherein the hydraulic devices of the second set of hydraulic devices are disposed about an axis of the shaft; and operating each of the hydraulic devices so as to transfer torque from the first element to the second element. If desired, operating can include operating each of the hydraulic devices so as to transfer torque from the first element to the second element while maintaining a selected orientation an axis of rotation of the first element relative to a rotational axis of the shaft. Also, if desired, operating can include operating each of the hydraulic devices so as to transfer torque from the first element to the second element while controlling stiffness and/or damping.

Another embodiment of the invention, is an elastomeric bearing that includes a first support surface; a housing having a second support surface and walls forming an inner surface; a rigid support plate; a first portion comprising alternating laminated layers of elastomeric material and support layers, the first portion bonded to the first support surface and the rigid support plate; and a second portion comprising an elastomeric material bonded to the rigid support plate and disposed in the housing, at least a portion of which is surrounded by the walls.

BRIEF DESCRIPTION OF THE DRAWINGS

FIG. 5A is a perspective view of another test assembly.

FIG. 5B is an elevational view of the test assembly of FIG. 5A.

FIG. 6 is a schematic illustration of another test assembly.

DETAILED DESCRIPTION OF ILLUSTRATIVE EMBODIMENTS

Figure 1:
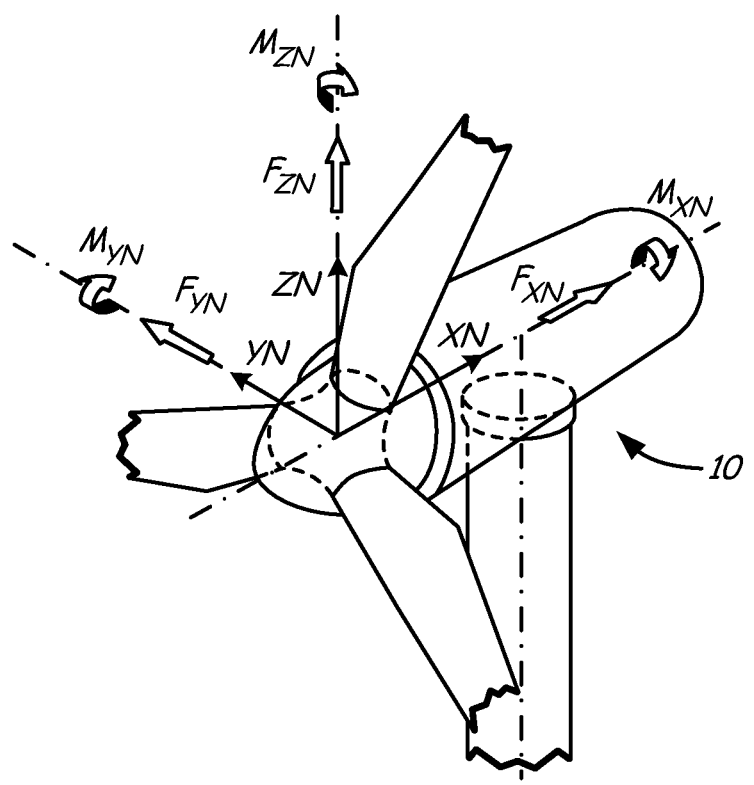
FIG. 1 is a schematic view of loads present on a wind turbine assembly.
Figure 2:
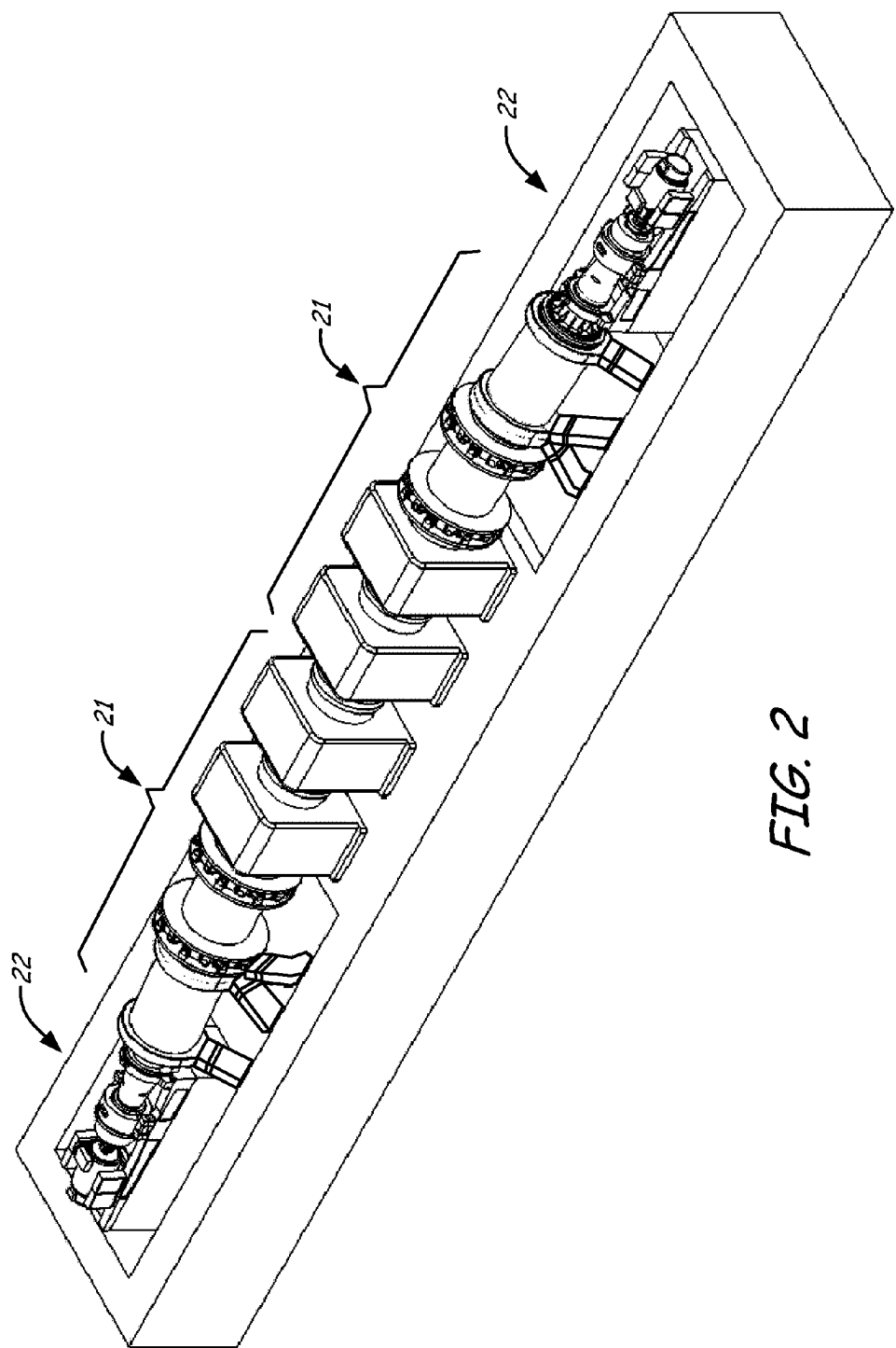
FIG. 2 is a perspective view of a test assembly for testing a pair of wind turbine assemblies.
Figure 3:
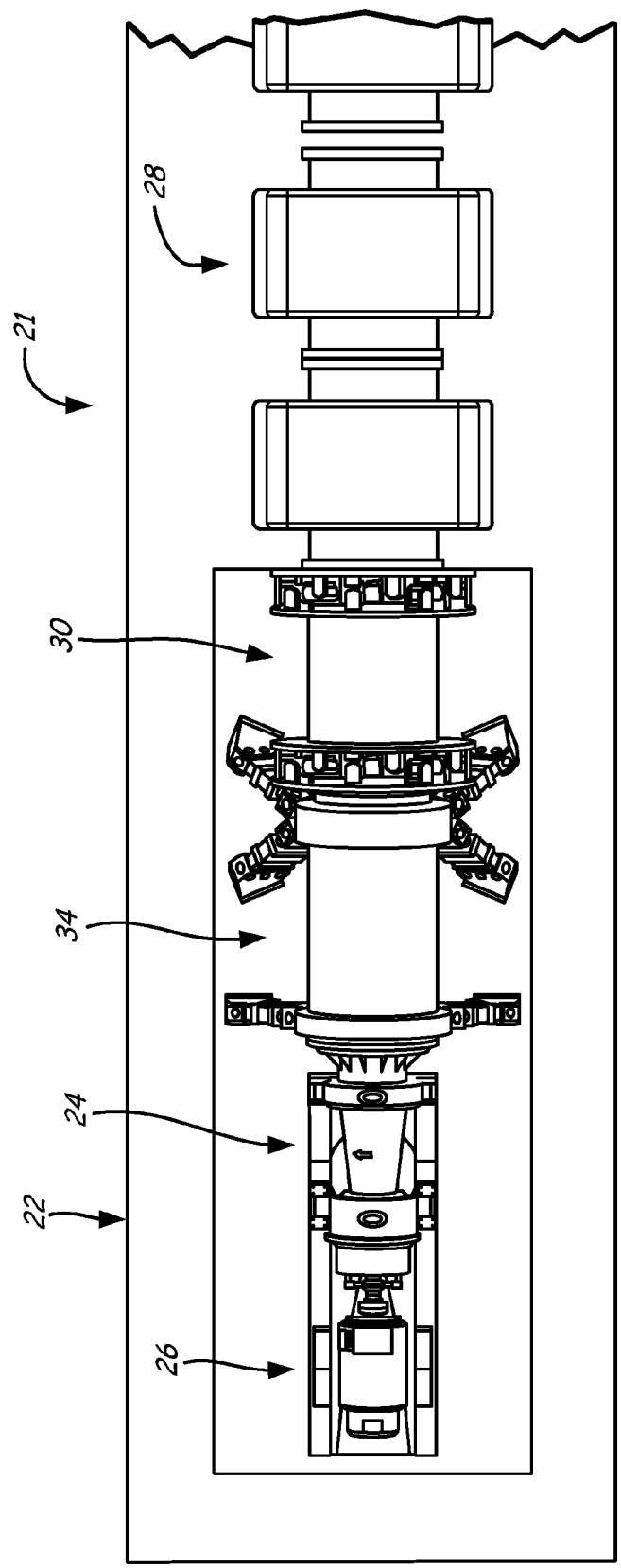
FIG. 3 is a top plan view of a portion of the test assembly of FIG. 2.
Figure 4:
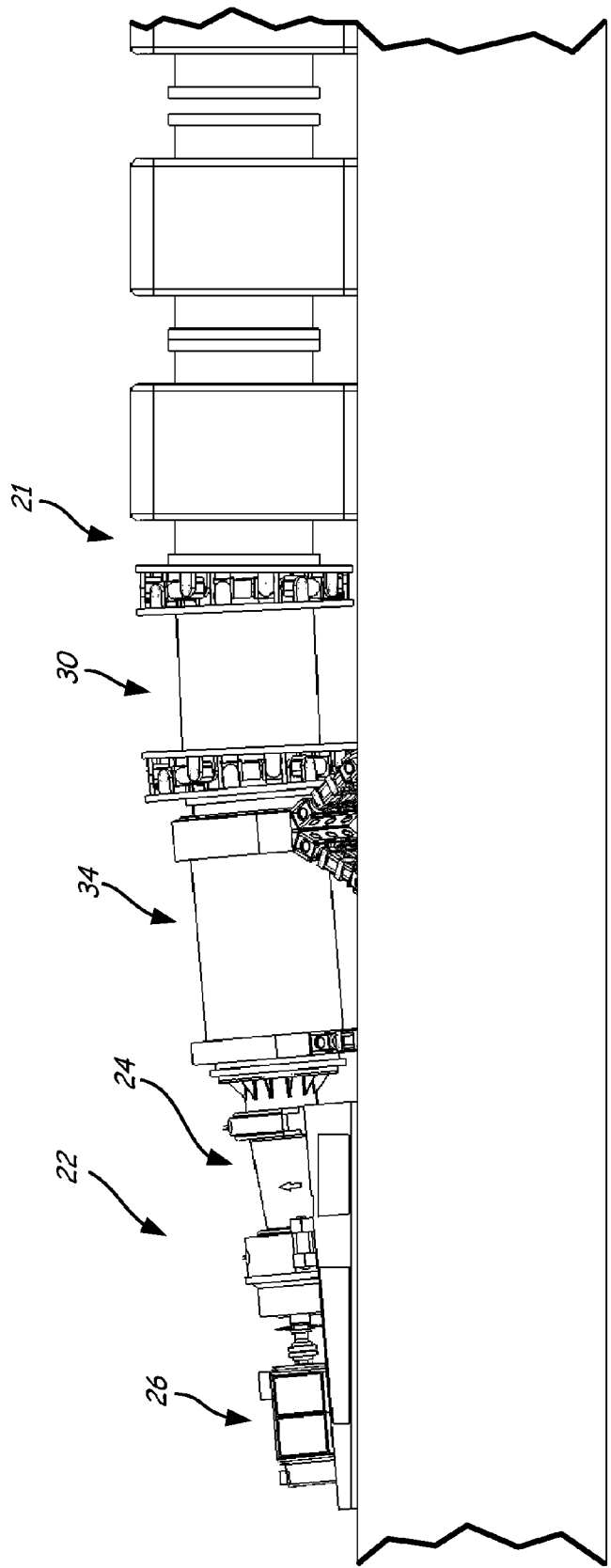
FIG. 4 is an elevational view of a portion of the test assembly of FIG. 2.

FIGS. 2-8 illustrate a first embodiment of a test assembly 21 for testing a test specimen such as but not limited to a wind turbine assembly 22 by applying selected force and/or moment loads as described above to the wind turbine assembly 22. The test assembly 21 can be used to simulate or measure force and/or moments loads (which includes torque on an rotational shaft of the turbine assembly 22) commonly experienced by the wind turbine assembly 22 in normal operation and/or used to ascertain load limits of a wind turbine assembly design.

The wind turbine assembly 22 under test typically includes a drive train composed of a gearbox 24, an optional generator 26, and a low speed shaft (LSS) with bearings. An end of the gearbox 24, which can comprise a portion of the hub, or coupled to a hub, or coupled through the low speed shaft, is coupled to the test assembly 21. The test assembly 21 drives or rotates the drive train while also applying force and/or moment/torque loads to the end of the drive train. Generally, the test assembly 21 includes a prime mover 28 such as but not limited to an electric or hydraulic motor with an optional gearbox to obtain the desired rotations per minute and torque. The prime mover 28 is connected to a torque transfer coupling 30 that in turn is coupled to an input shaft 32, or formed part thereof. The input shaft 32 is connected to the end of the drive train in a rigid manner to transfer torque and forces thereto. An actuator assembly 34 is used to apply forces and/or moments to the input shaft 32. The torque transfer coupling 30 transfers drive torque from the prime mover 28 to the actuator assembly 34, while still allowing movement of the actuator assembly 34 and/or wind turbine assembly 22.

Figure 7:
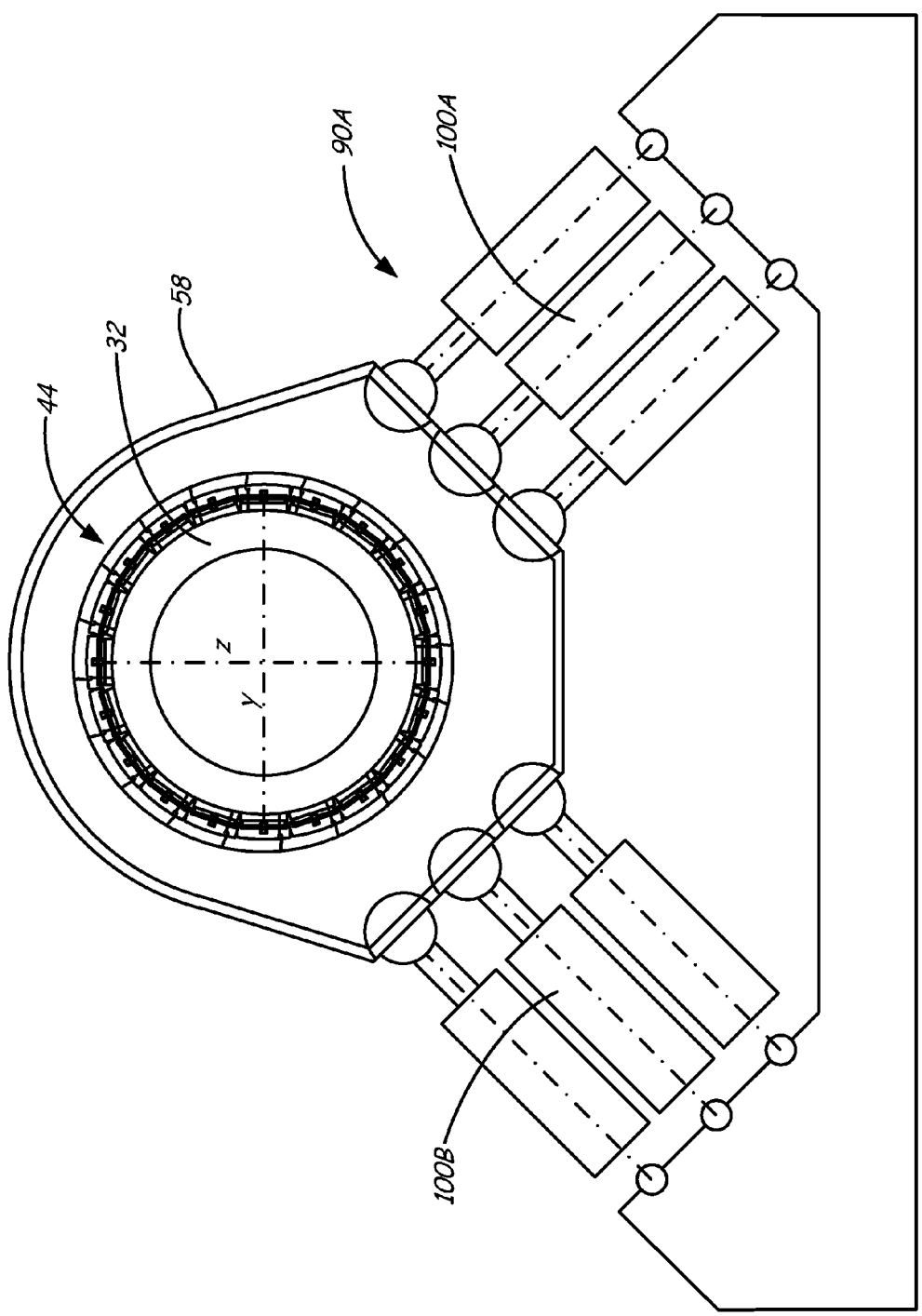
FIG. 7 is a front elevational view of the test assembly of FIG. 6.

Referring to FIGS. 6-7, input shaft 32 is supported for rotation on hydraulic bearing assemblies 40 and 42 at spaced-apart locations along the axis of rotation of the input shaft 32. In the embodiment illustrated, hydrostatic bearings (pressure fed hydrostatic bearings) are described herein by example and will be mentioned below. However, it should be understood other forms of hydraulic bearings can be used such as but not limited to pressure balanced sealed bearings, hydrodynamic bearings, spherical roller bearings, etc.

Figure 8:
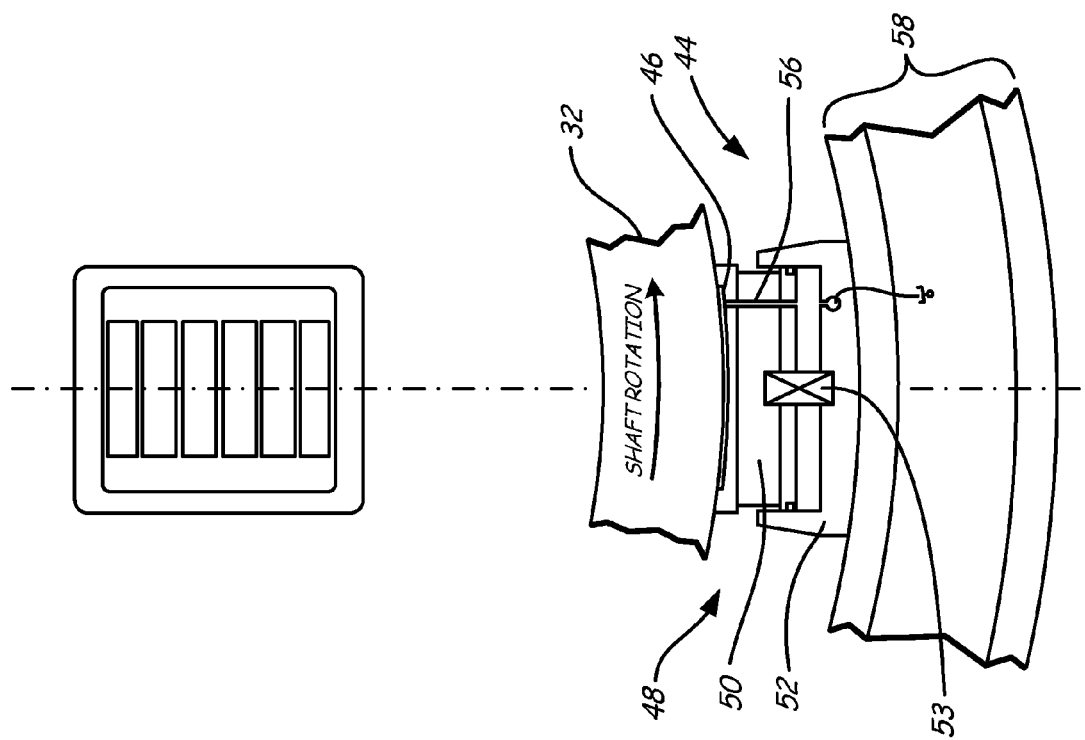
FIG. 8 is a schematic illustration of a hydraulic bearing assembly.

In the exemplary embodiment, hydraulic (e.g. hydrostatic) bearing assemblies 40, 42 are bearing element assemblies 44 spaced circumferentially or segmented about a surface (e.g. outer surface) of the input shaft 32. FIG. 8 illustrates a bearing element assembly 44 in detail. The bearing element assembly 44 includes hydrostatic pad 46 supported by an actuator 48. In the exemplary embodiment illustrated, the actuator 48 comprises a fluid actuator having a piston 50 movable in a cylinder 52. If desired, a preload internal spring 53 can be provided and operably connected to the piston 50 and cylinder 52. The piston 50 supports the hydrostatic pad 46. The hydrostatic pad 46 supports the input shaft 32 while it rotates on a thin film of fluid provided to the pad 46 from a flow restricting passageway 56 extending through the piston 50. The passageway 56 typically extends into the chamber of the cylinder 52. Each cylinder 52 is connected to a support collar or housing 58. An outer support structure such as a tube 60 (FIG. 6) joins the support collars 58 together.

A thrust bearing 62 is also provided for input shaft 32. The thrust bearing 62 sustains axial loads and controls axial movement of input shaft 32. The thrust bearing 62 can take numerous forms. In one advantageous embodiment that has low friction, thrust bearing 62 also comprises a segmented hydrostatic assembly with bearing element assemblies 64 (two of which are illustrated in FIG. 6) disposed circumferentially about the axis of input shaft 32. Each bearing element assembly 64 is constructed in a manner similar to bearing assembly 44 with piston/cylinder actuators, where a first plurality of bearing element assemblies 64A include hydrostatic pads configured to face an annular surface 66A and apply force in a first axial direction along the shaft 32, while a second plurality of bearing element assemblies 64B include hydrostatic pads configured to face an annular surface 66B and apply force in a second axial direction (opposite the first axial direction) along the shaft 32, each of the annular surfaces 66A and 66B being about the shaft 32 and in a plane orthogonal to the axis of rotation of the shaft 32, wherein the annular surfaces face in opposite directions, herein toward each other. The piston/cylinder assemblies of the bearing assemblies 64A and 64B are configured to react axial forces to a support collar 68. The support collar 68 can be fixedly secured to support collar 58 with a support structure such as tube 70.

A controller 80 illustrated in FIG. 6 provides control signals 82 to a hydraulic power source 83 (e.g. pump, accumulators, servo valves, etc.) that in turn is fluidly coupled to each bearing element assembly 44 and 64 so as to maintain the position of input shaft 32 in the proper position in spite of loads applied via actuator assembly 34 discussed below as well as deflections of the support structure 58, 68, etc, thereby allowing the support structure to be less rigid hence cheaper.

Controller 80 can receive input signals 84 indicative of parameters (e.g. position) of the input shaft 32 as it rotates from suitable sensors 85 (e.g. displacement) and operate in closed-loop control to maintain the desired position of input shaft 32. Pressure sensors (not shown) can also be provided and operably coupled to measure pressures within some or all of the piston/cylinder assemblies in the bearing element assemblies 44 and 64. Signals from the pressure sensors can be provided to controller 80 as input signals 86. Controller 80 uses the input signals 86 to ascertain forces and moments/torque applied to shaft 32. The extension and retraction of some or all of the bearing element assemblies 44 and 64 can be monitored with sensors and provided as inputs to controller 80, if desired, for example to control operation of each bearing element assemblies 44 and 64.

In the embodiment illustrated in FIGS. 2-7, the actuator assembly 34 includes a plurality of actuators 90 grouped in sets 90A, 90B and 90C, each set 90A, 90B and 90C spaced-apart from each other along the axis of the input shaft 32. Referring to FIG. 6, a first set of actuators 90A are disposed at a first end of shaft 32, for example connected to support collar 58 of bearing 40, while a second set of actuators 90B and a third set of actuators 90C are disposed at an end of shaft 32 opposite of the first set 90A, for example connected to support collar 58 of bearing 42 and/or support collar 68. Set 90A includes at least two actuators 100A and 100B (FIG. 7) radially spaced from each other about the axis of shaft 32. As illustrated, additional actuators can be provided essentially in parallel to each of the actuators 100A and 100B, depending on the amount of force that needs to be applied. Actuators of sets 90B and 90C are oriented in a manner similar to that of set 90A wherein at least two actuators are radially spaced from each other about the axis of shaft 32. However, the actuators of sets 90B and 90C are also oriented oblique to the axis of shaft 32 (rather than orthogonal as in set 90A) so that an axial force ($F_X$) can be selectively applied to shaft 32. The controller 80 provides control signals to hydraulic power source 83 (although a separate hydraulic power source can be provided) so as to operate the actuators of sets 90A, 90B and 90C and generate axial force $F_X$, radial forces $F_Y$, $F_Z$, and moments about radial axes orthogonal to the shaft axis, i.e. $M_Y$, $M_Z$ as desired including two or more loads (forces and/or moments) simultaneously.

It should be noted the configuration of actuators 90 herein described and illustrated should not be construed as limiting, but rather as an exemplary embodiment wherein other configurations are possible. For instance, FIGS. 5A and 5B illustrate another embodiment 21' where actuator assembly 34' comprises sets 90A', 90B' and 90C'. In particular, set 90A' comprises just actuators 100A and 100B, while sets 90B' and 90C' comprise pairs of parallel operating actuators rather than groups of three parallel operating actuators.

Figure 9:
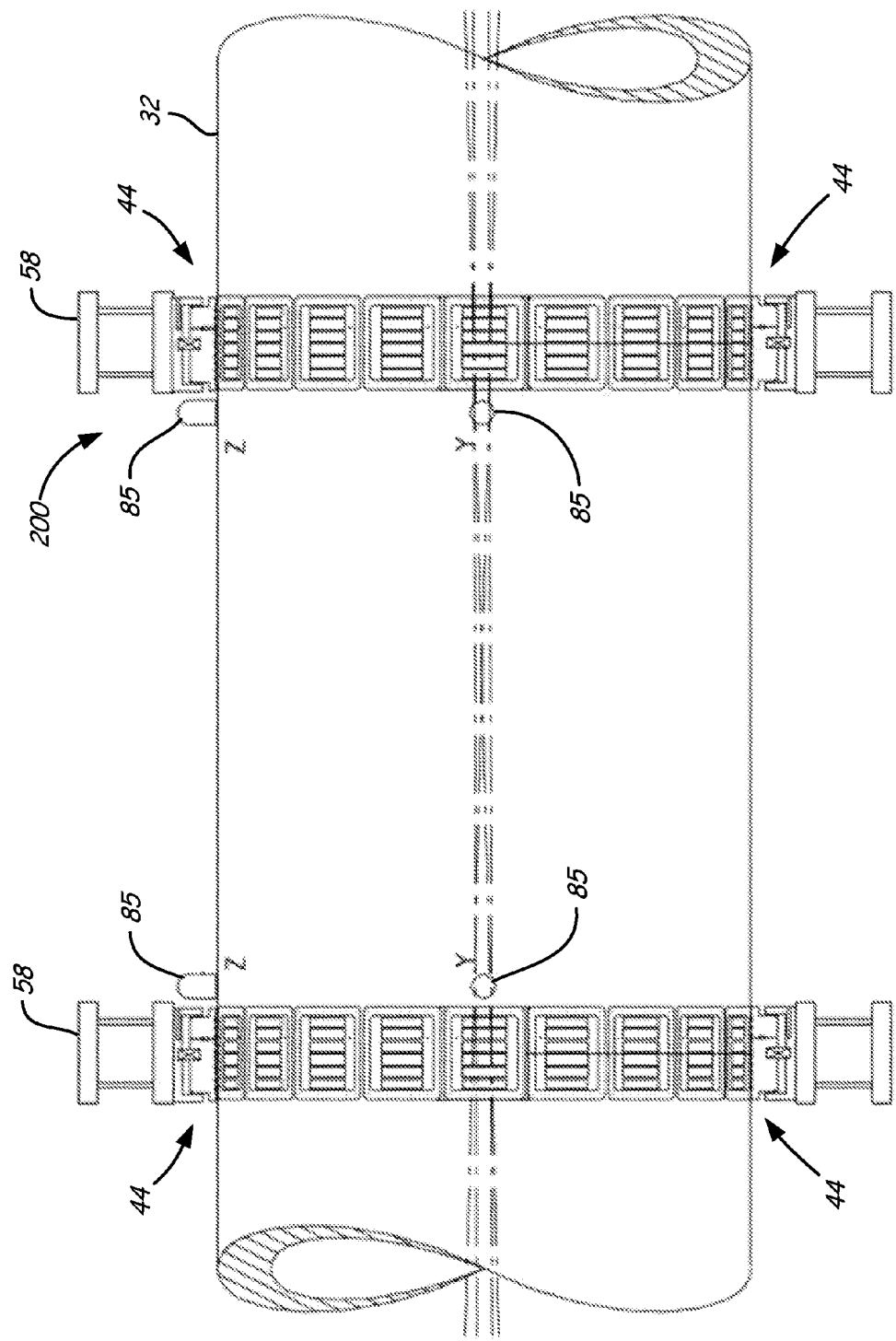
FIG. 9 is a schematic illustration of two sets of hydraulic bearing assemblies for controlling rotation of a shaft.
Figure 10:
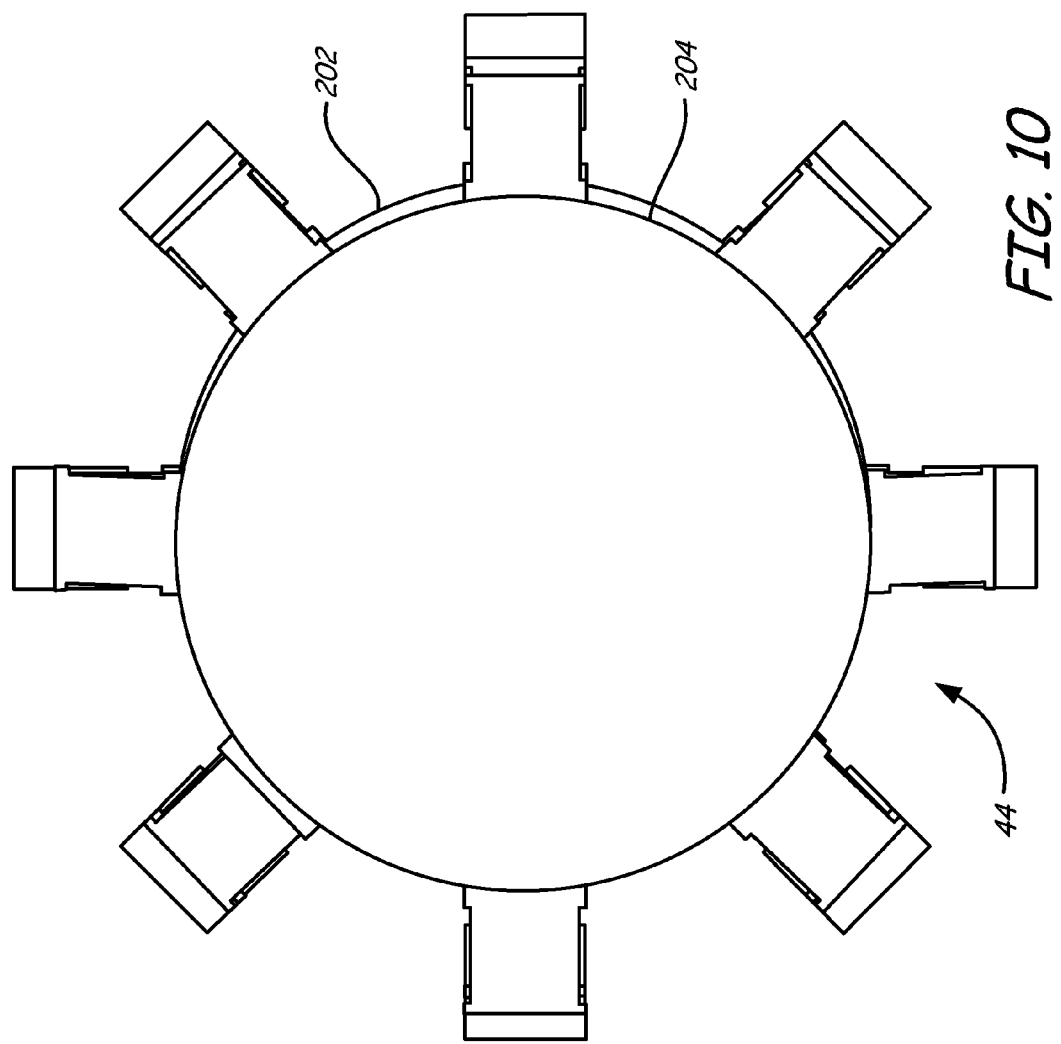
FIG. 10 is a schematic illustration of a plurality of hydraulic bearing assemblies used to control a position of a rotating shaft.
Figure 11:
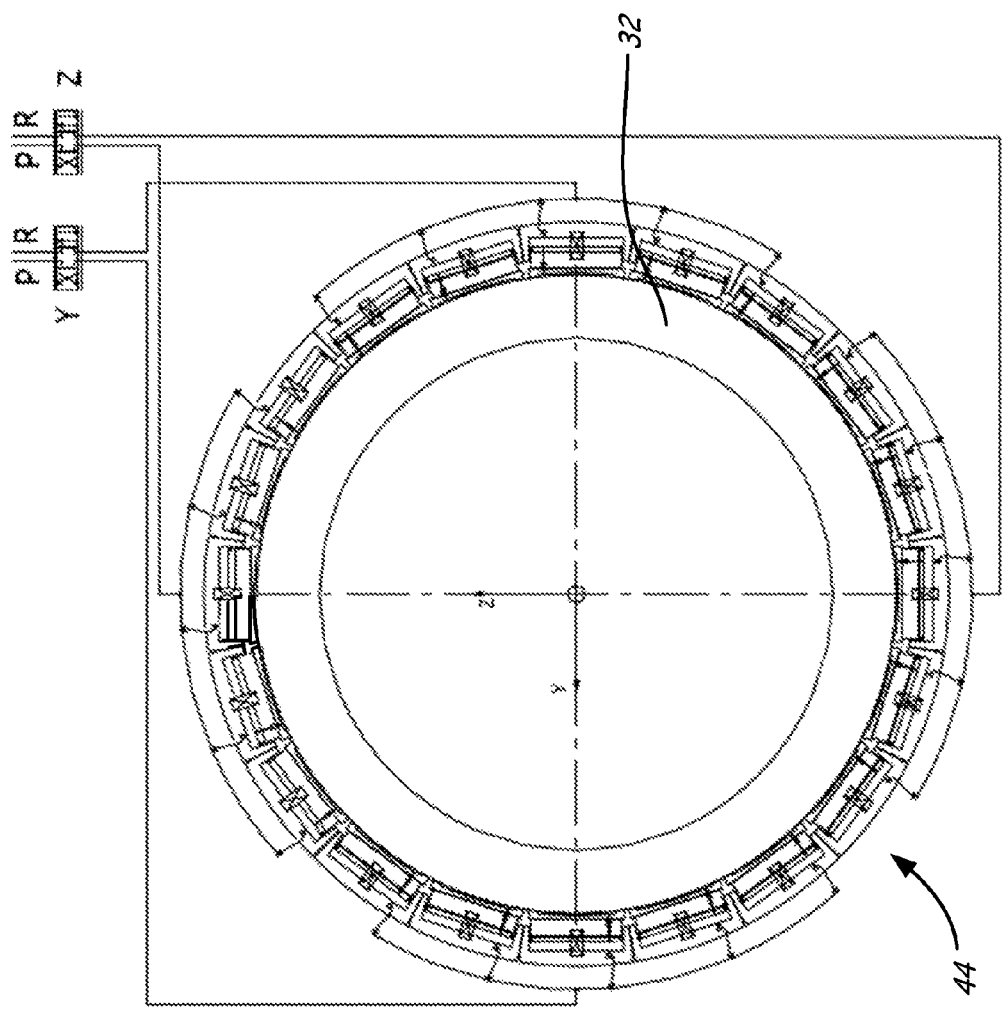
FIG. 11 is a schematic illustration of a plurality of hydraulic bearing assemblies.

Another embodiment of an actuator assembly 200 is illustrated in FIG. 9. Actuator assembly 200 is different from actuator assembly 34 in that some if not all external actuators 90 are omitted. In this embodiment, selected force and/or moment loads are generated from the bearing element assemblies 44 and/or 64 (not shown in FIG. 9 but similar to that illustrated in FIG. 6), which are constructed in a manner similar to that described above; however, the stroke or travel of each of the piston/cylinder assemblies is considerably longer. For instance, in one embodiment, the travel of the piston/cylinder assemblies is in the range of 2-3 inches. In a further embodiment, the travel of the piston/cylinder assemblies is in the range of 3-5 inches. In yet a further embodiment, the travel of the piston/cylinder assemblies is 5 or more inches. FIG. 10 schematically illustrates a set of bearing element assemblies 44 controlling the position of a shaft to be in a centered position as indicated by circle 202 or in an offset position as indicated by circle 204. FIG. 11 illustrates hydraulic fluid connections to the bearing element assemblies 44 so as to control positioning of the shaft 32. In particular, the bearing element assemblies 44 can be hydraulically controlled in opposed sets, herein by way of example four sets; however, more or less sets, or even individual control of each bearing element assembly 44 can be implemented.

Referring back to FIG. 9, in this embodiment, support collars 58 are fixedly secured to suitable base (not shown). The controller 80 provides control signals 102 to hydraulic power source 83 so as to operate the piston/cylinder assemblies of bearing element assemblies 44 and 64 of actuator assembly 200 to generate axial (thrust) force $F_X$, radial (shear) forces $F_Y$, $F_Z$, and moments about radial axes orthogonal to the shaft axis, i.e. $M_Y$, $M_Z$ as desired including two or more loads (forces and/or moments) simultaneously.

Position sensors 85 (schematically illustrated) can be provided as needed to monitor the position of shaft 32 and provide corresponding input signals to controller 80 for position feedback. Position feedback can also be provided with suitable sensors measuring the piston/cylinder relationship of a plurality if not all of the bearing element assemblies 44 and 64. As described above, pressure sensors (not shown) can also be provided and operably coupled to measure pressures within some or all of the piston/cylinder assemblies in the bearing element assemblies 44 and 64. Signals from the pressure sensors can be provided to controller 80 as input signals 86. Controller 80 can use the input signals 86 to ascertain forces and moments/torque applied to shaft 32.

Although illustrated in FIG. 9, where the support collars 58 or housing is rigidly secured to a base, in yet another embodiment, external actuators such as actuators 90 described above can be used in combination with the long stroke bearing element assemblies 44 and 64 just described to impart additional load(s) in one or more degrees of freedom in combination with loads generated by bearing element assemblies 44 and 64.

FIGS. 15-19 illustrate another embodiment of an actuator assembly 250 having two pluralities of hydraulic (e.g. hydrostatic) bearing assemblies 252 and 254, each plurality of hydraulic bearing assemblies 252, 254 being spaced circumferentially about a surface (e.g. outer surface) of the input shaft 32. However, in this embodiment, the hydraulic bearing assemblies in each plurality 252, 254 are grouped in sets (e.g. sets 252A, 252B, 252C and 252D and where plurality 254 are similarly grouped), each set acting upon a common shoe 256, which in turn, acts upon the surface of a shaft such as the input shaft 32. In the illustrated embodiment, each set comprises two hydraulic bearing assemblies 258; however, this should not be considered required or limiting wherein one or more hydraulic bearing assemblies can be provided for each shoe 256. As in the previous embodiment, the sets can be hydraulically controlled in opposed sets, herein by way of example four sets; however, more sets can be used. In addition, depending on the desired loads to be applied, the number of hydraulic bearing assemblies acting upon each shoe 256 may vary, although the number of hydraulic bearing assemblies for each shoe 256 in each opposed set are typically the same. Each shoe includes hydrostatic pads 260 that support the input shaft 32 while it rotates on a thin film of fluid provided to each pad from a flow restricting passageway extending through the shoe. The hydraulic bearing assemblies 258 of each shoe 256 can be configured so that hydrostatic pads 257 and corresponding thin films are operating upon the surface of the shoe 256, or as illustrated, upon a surface of a support structure 264 such as a corresponding support collar 266 thereof.

If desired as illustrated, each shoe 256 can further be configured so as to operate as a thrust bearing acting upon annular surfaces 270, 272 at each end of the input shaft 32. As with the radially oriented hydrostatic pads 260, hydrostatic pads 274 on the side surface of each shoe 256 supports the input shaft 32 via the annular surface while it rotates on a thin film of fluid provided to each pad 274 from a flow restricting passageway extending through the shoe 256. A hydraulic bearing assembly or assemblies 280, as illustrated, provide axial force upon the input shaft 32 via annular surfaces 270, 272. Each of the annular surfaces 270 and 272 is disposed in a plane that is orthogonal to the axis of rotation of the shaft 32 and, herein face each other, although in another embodiment the shoes 256 and hydraulic bearing assemblies 280 can be arranged to engage annular surfaces that face away from each other. The hydraulic bearing assemblies 280 associated with each shoe 256 can be configured so that hydrostatic pads and corresponding thin films thereof are operating upon the surface of the shoe 256 or upon a surface of the corresponding support collar 266 or other structure. Sensors and controller can be provided as discussed above in the previous embodiments to control all the hydraulic assemblies 258 and 280 to provide loads as desired upon the shaft 32 in up to five degrees of freedom.

Figure 13:
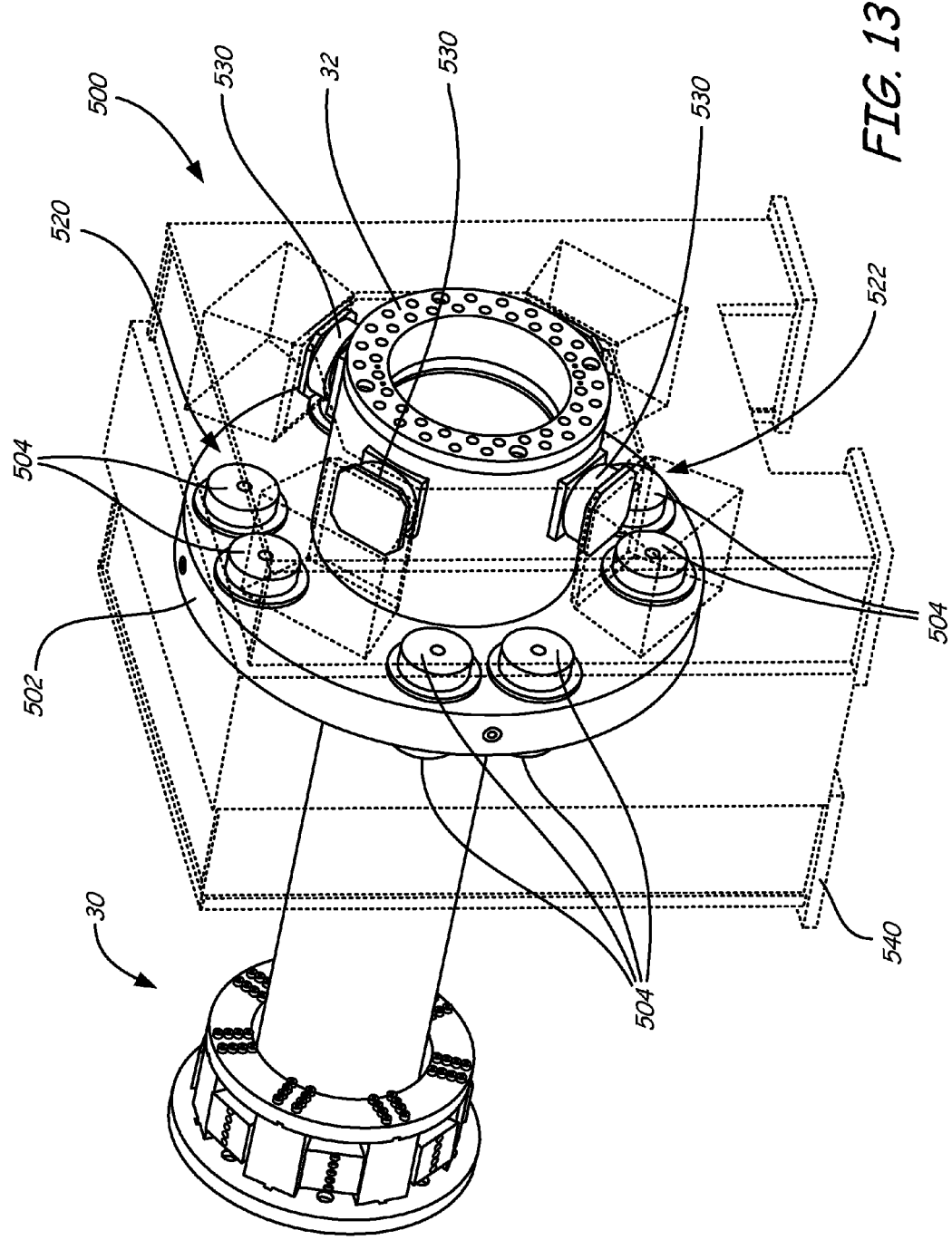
FIG. 13 is a perspective view of another test assembly.
Figure 14:
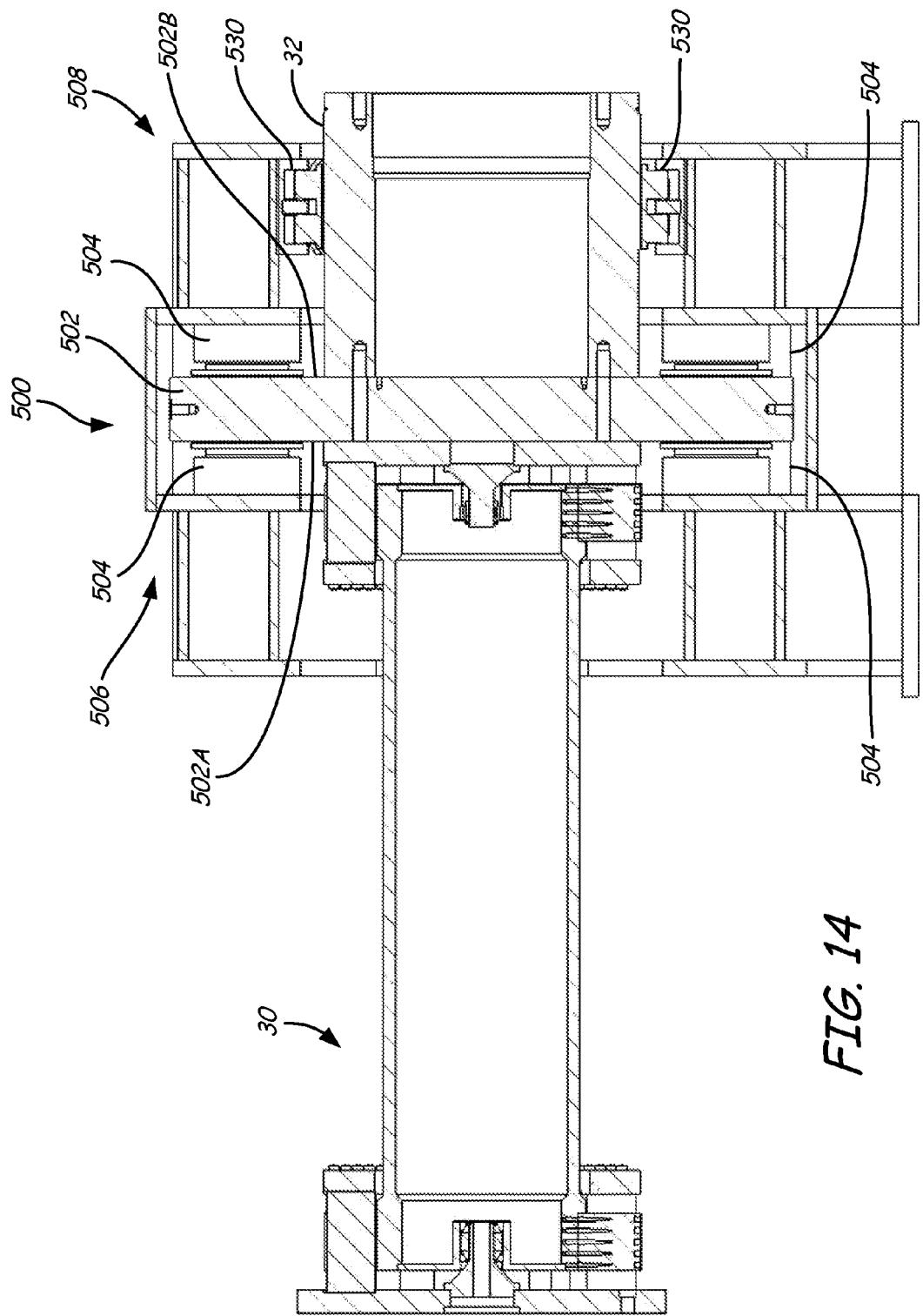
FIG. 14 is an elevational view of the test assembly of FIG. 13.
Figure 15:
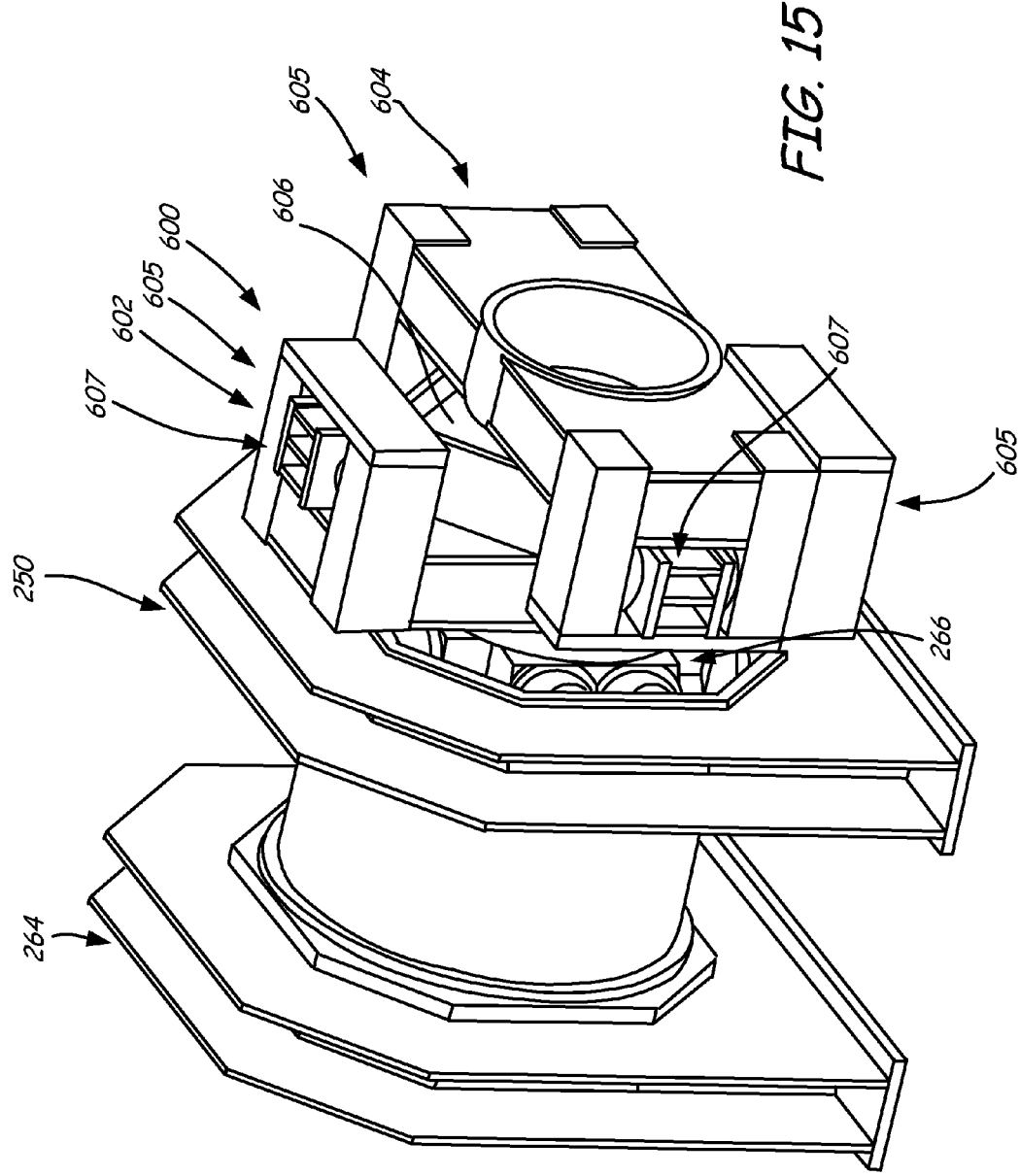
FIG. 15 is a perspective view of another test assembly and torque transfer coupling.
Figure 16:
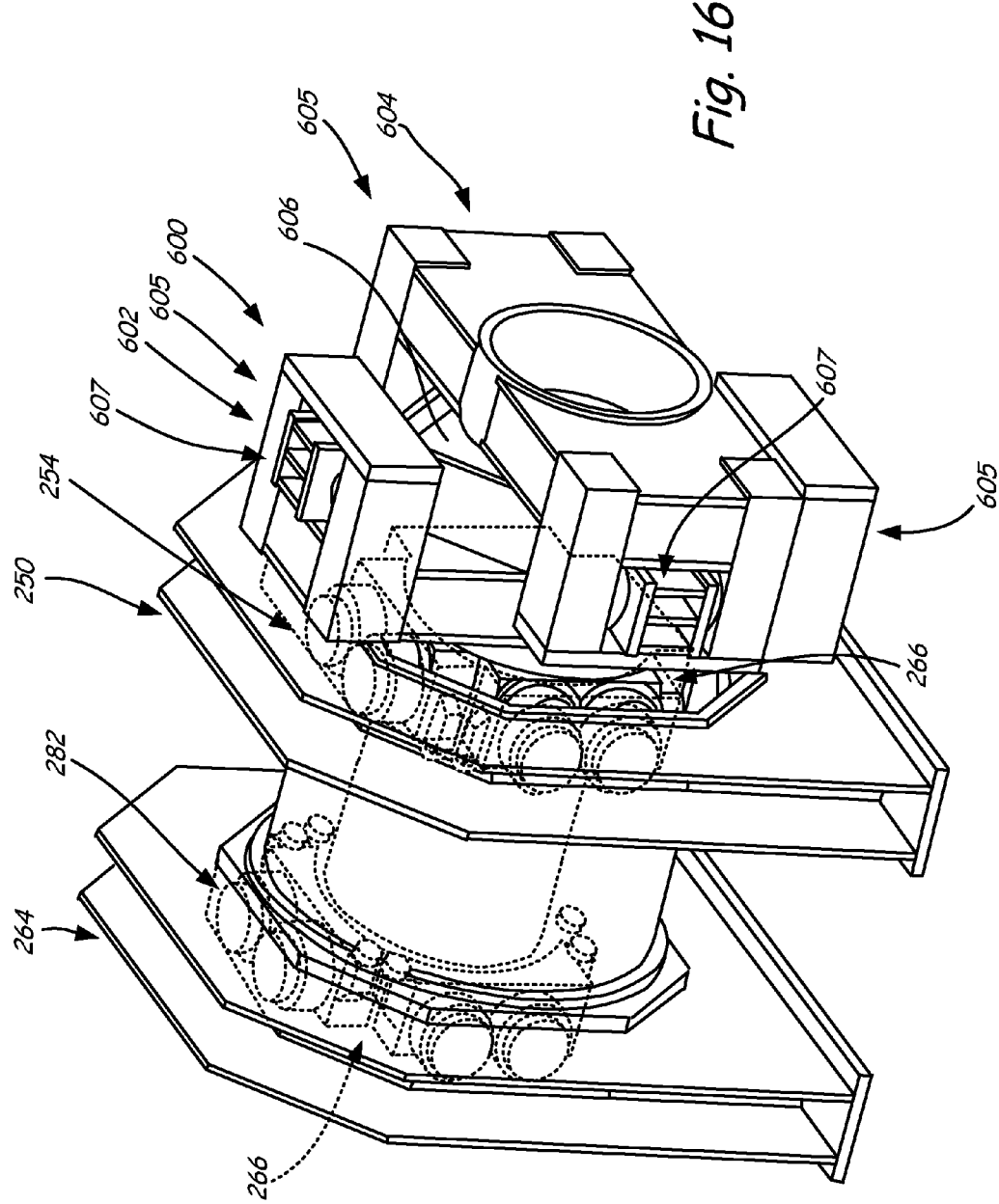
FIG. 16 is a perspective view of another test assembly and torque transfer coupling.
Figure 17:
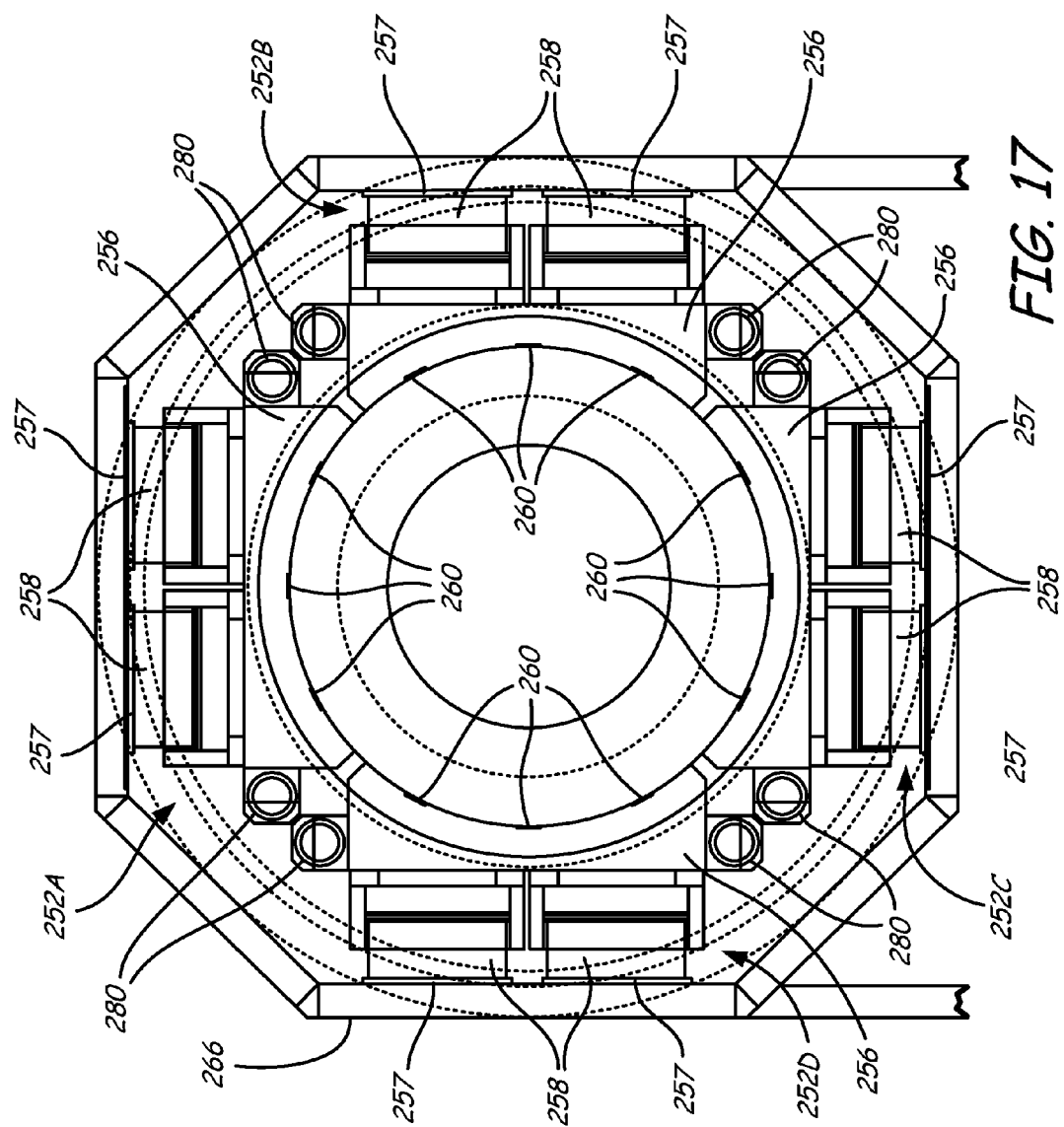
FIG. 17 is a sectional view of the test assembly of FIG. 16.
Figure 18:
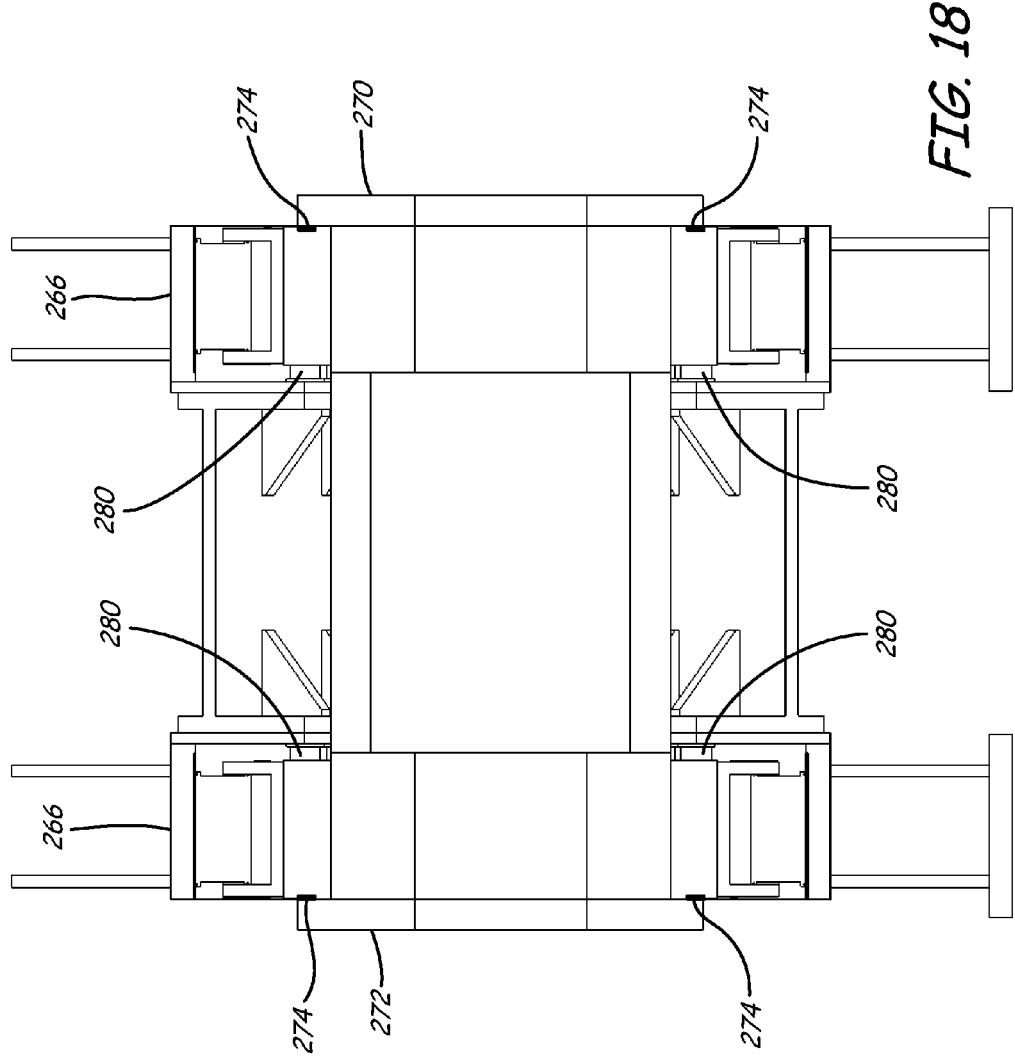
FIG. 18 is a top plan view of a portion of the test assembly of FIG. 16.
Figure 19:
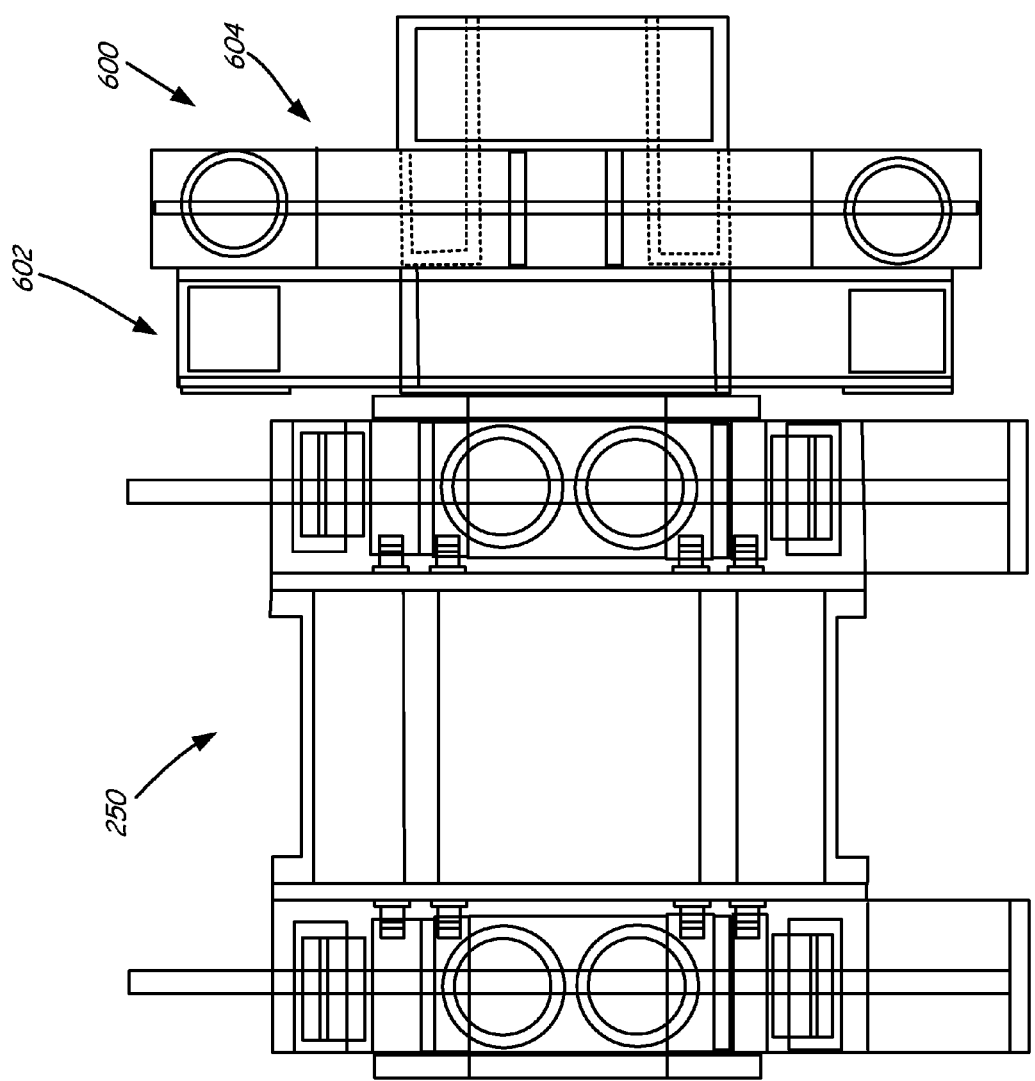
FIG. 19 is a top plan view of the test assembly of FIG. 16.
Figure 20:
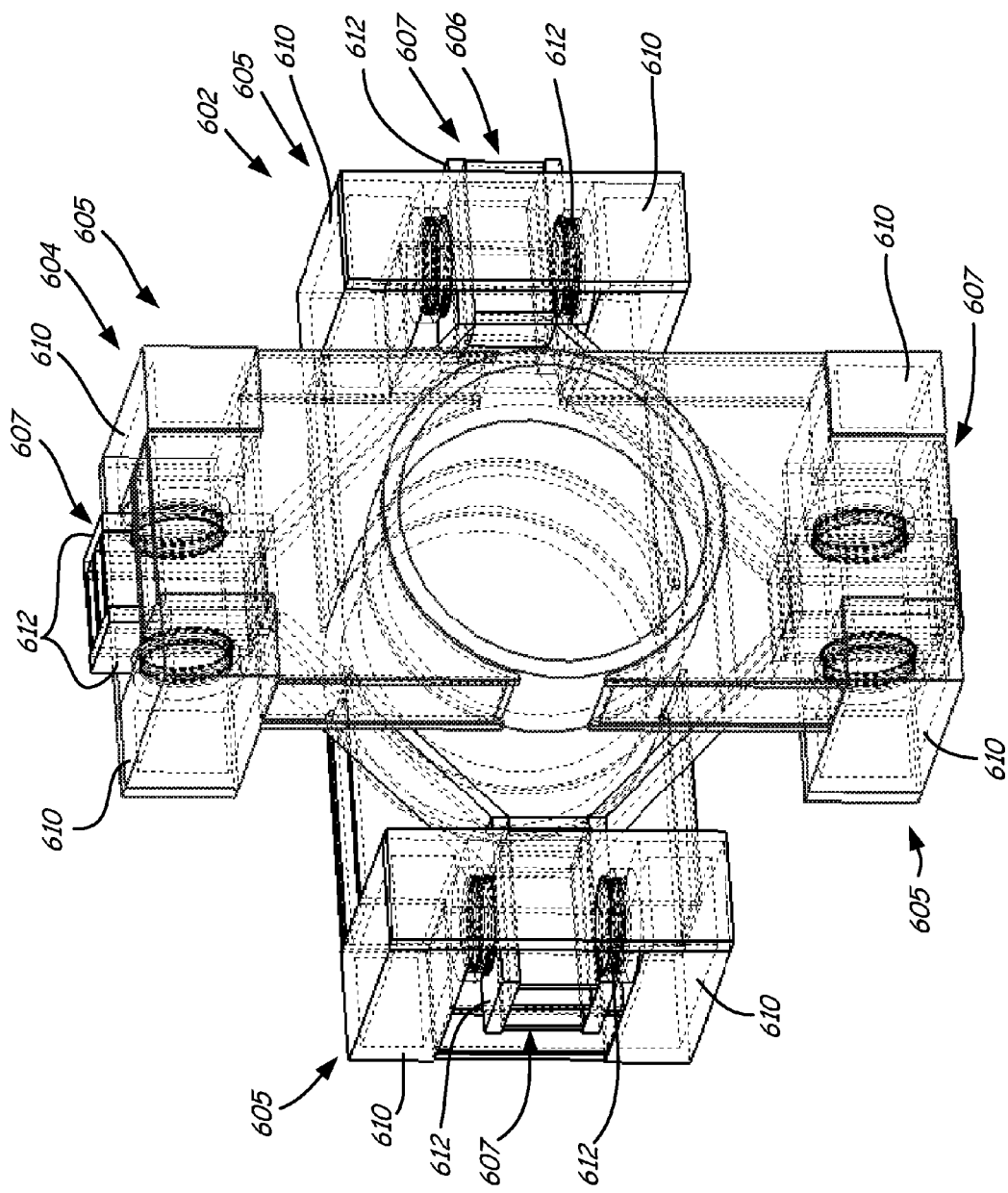
FIG. 20 is a perspective view of the torque transfer coupling of FIG. 16.
Figure 21A:
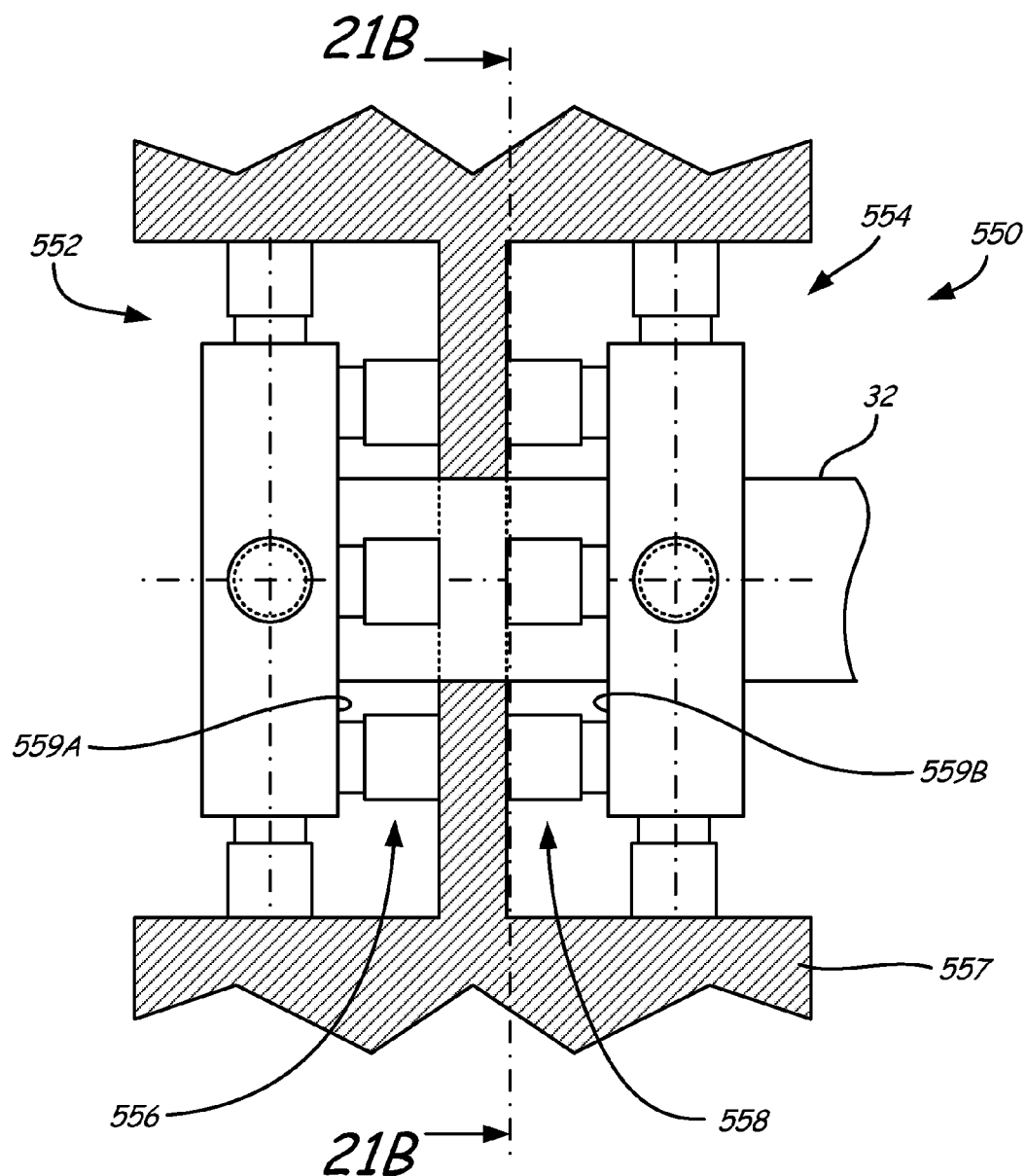
FIG. 21A is a schematic illustration of another test assembly.
Figure 21B:
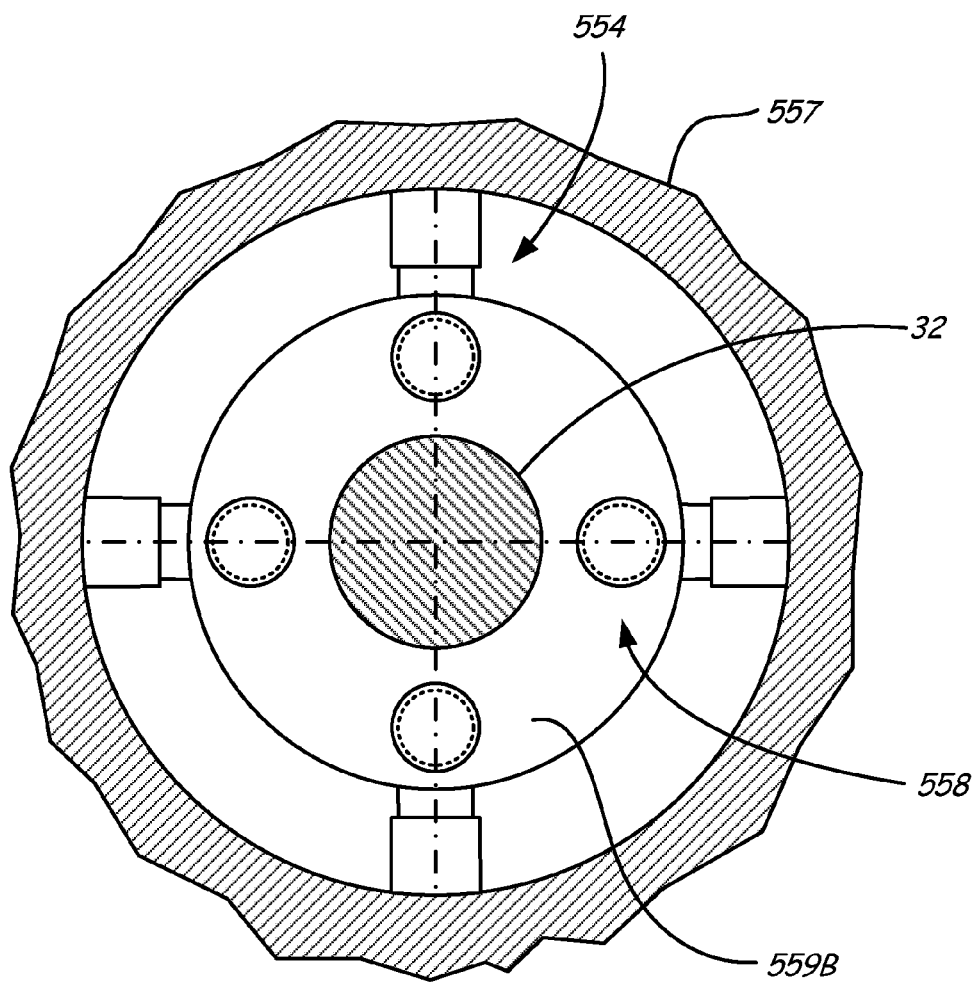
FIG. 21B is a sectional view of the test assembly taken along lines 21B-21B in FIG. 21A.
Figure 21C:
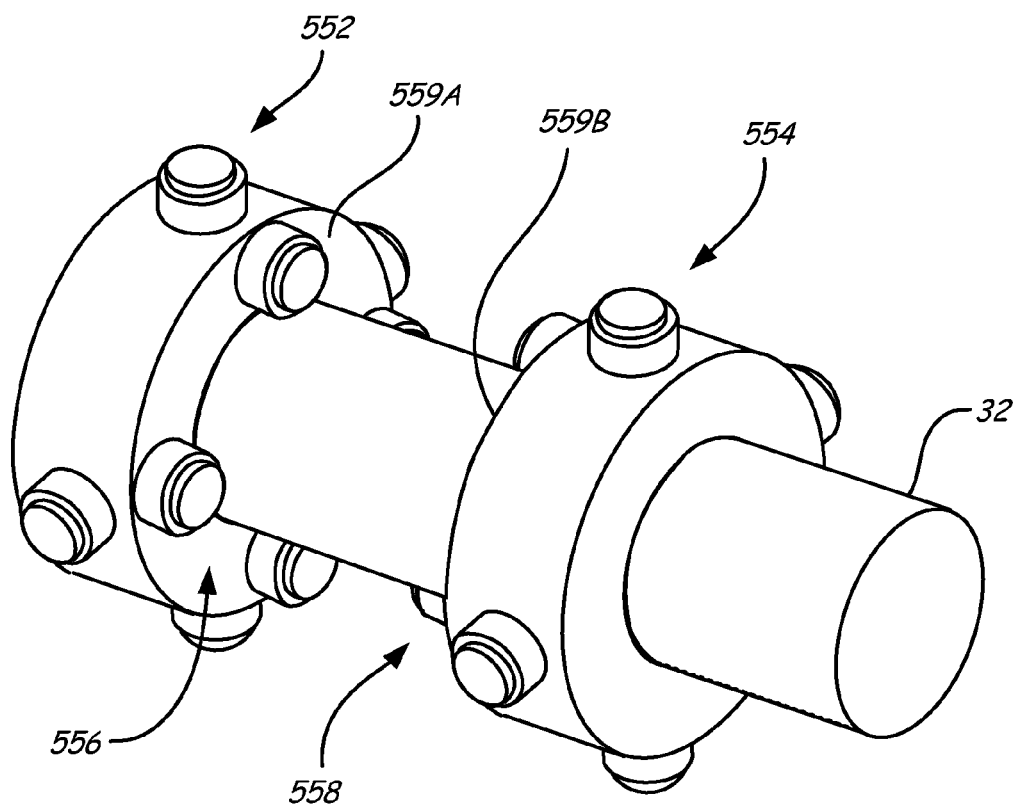
FIG. 21C is a perspective view of the test assembly of FIG. 21A with portions removed.

Yet another actuator assembly 500 for imparting selected forces and moments to the input shaft 32 is illustrated in FIGS. 13 and 14. In this embodiment, a disc 502 is coupled to or formed as unitary body with a shaft such as input shaft 32 and a plurality of actuators, in particular, hydraulic (e.g. hydrostatic) bearing assemblies 504 engage surfaces of the disc 502 to impart selected forces thereon, and thus, upon input shaft 32. As illustrated, a first set of hydraulic bearing assemblies 506 are configured to engage a first annular surface 502A of disc 502, while a second set of hydraulic bearing assemblies 508 are configured to engage a second annular surface 502B of disc 502, each of the annular surfaces 502A and 502B being disposed in a plane that is orthogonal to the rotational axis of the shaft 32, and face in opposite directions, herein away from each other. Each of the sets of hydraulic bearing assemblies 506 and 508 include individual hydraulic bearing assemblies 504 spaced apart and disposed about an axis of rotation of disc 502. In the embodiment illustrated, the individual hydraulic bearing assemblies 504 are organized in opposed pairs facing each other on each side of disc 502, which although may simplify operation or control of the hydraulic bearing assemblies to develop selected forces and/or moments upon disc 502 should not be considered as required or limiting.

Each of the sets of hydraulic bearing assemblies 506 and 508 includes at least two spaced apart hydraulic bearing assemblies 504, and commonly, three or more spaced apart hydraulic bearing assemblies, depending on the desired number of forces and/or moments to be exerted upon disc 502. In a particularly convenient embodiment, each of the sets of hydraulic bearing assemblies 506 and 508 include spaced apart hydraulic bearing assemblies 504 configured to apply opposed forces to each side of the disc 502 at 90 degree intervals about the axis of rotation of the disc 502. In this manner, the hydraulic bearing assemblies 504 can be controlled to exert thrust loads along the axis of rotation of disc 502 as well as exert moments about two axes that are mutually orthogonal to each other and the axis of rotation of disc 502. It should be noted that two or more hydraulic bearing assemblies 504 can be disposed in close proximity to each other such as at 520 and 522, if for example, moments about one axis may be greater than moments about the other axis.

In a further embodiment, a second plurality of actuators, in particular, hydraulic (e.g. hydrostatic) bearing assemblies 530 engage circumferential surfaces of the rotating shaft such as the input shaft 32 as illustrated, or of an element connected thereto such as part of the torque transfer coupling 30 or even disc 502. However, at this point it should be noted that the presence of torque transfer coupling 30 is not required, but rather is merely an illustrative embodiment.

At least two spaced apart hydraulic bearing assemblies 530, and commonly, three or more spaced apart hydraulic bearing assemblies, depending on the desired number of forces to be exerted upon input shaft 32. In a particularly convenient embodiment, the spaced apart hydraulic bearing assemblies 530 are configured to apply opposed forces to the input shaft 32 at 90 degree intervals about the axis of rotation of the shaft 32. In this manner, the hydraulic bearing assemblies 530 can be controlled to exert lateral or shear loads along two axes that are mutually orthogonal to each other and the axis of rotation of input shaft 32. Like hydraulic bearing assemblies 504, it should be noted that two or more hydraulic bearing assemblies 530 can be disposed in close proximity to each other about the axis of rotation of shaft 32, if for example, shear forces along one axis may be greater than shear forces along the other axis. However, if desired, additional hydraulic bearing assemblies contacting other circumferential rotating surfaces and operated in parallel with hydraulic bearing assemblies 504 can be used to exert additional shear forces upon the input shaft 32.

Hydraulic bearing assemblies 504 are actuators as well as bearings and they impart the force on disk 502 while allowing disk 502 to spin. Use of a disk allows efficient generation of torque loads. Similarly, hydraulic bearing assemblies 530 are actuators as well as bearings and they impart the force on the input shaft 32, or an element connected thereto, while allowing input shaft 32, or element connected thereto, to spin. A reaction structure 540 is provided for the hydraulic bearing assemblies 504 and/or 530. A controller, hydraulic power source and position sensors similar to that described above can be used to control hydraulic bearing assemblies 504 and/or 530.

Yet further embodiments for imparting selected forces and moments to the input shaft 32 are illustrated in FIGS. 21A-21C, 22A-22C, 23A-23C and 24A-24C. In the actuator assembly 550 illustrated in FIGS. 21A-21C, two axially spaced apart pluralities of hydraulic (e.g. hydrostatic) bearing assemblies 552 and 554 are provided. Each of the plurality of hydraulic bearing assemblies 552, 554 have individual hydraulic bearing assemblies spaced circumferentially about a surface (e.g. outer surface) of the input shaft 32, which can be operated so as to impart linear loads along and moments about axes orthogonal to the axis of rotation of shaft 32. Two additional sets of hydraulic bearing assemblies 556 and 558 are provided so as to impart axial loads along the axis of rotation 32. The individual hydraulic bearing assemblies of plurality 556 engage an annular surface 559A of shaft 32 that is disposed in a plane orthogonal to the axis of rotation of shaft 32. Likewise, the individual hydraulic bearing assemblies of plurality 558 engage annular surface 559B of shaft 32 that is disposed in a plane that orthogonal to the axis of rotation of shaft 32, where the surfaces 559A and 559B face in opposite direction, herein where the surface 559A faces surface 559B. A suitable support structure 557 is provided as a reaction structure for each of the hydraulic bearing assemblies (omitted in FIG. 21C for purposes of showing each of the plurality of hydraulic bearing assemblies 552, 554).

Figure 22A:
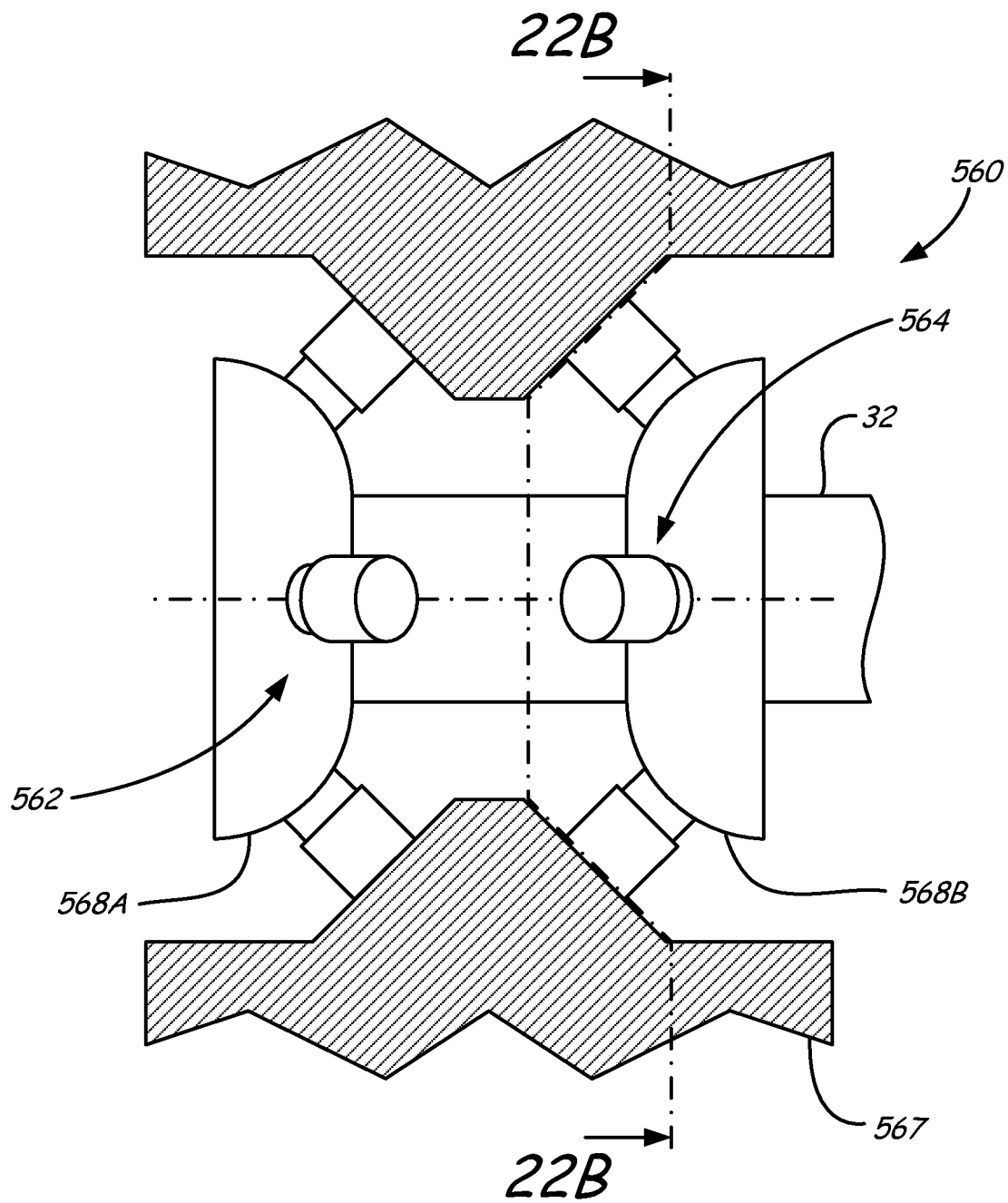
FIG. 22A is a schematic illustration of another test assembly.
Figure 22B:
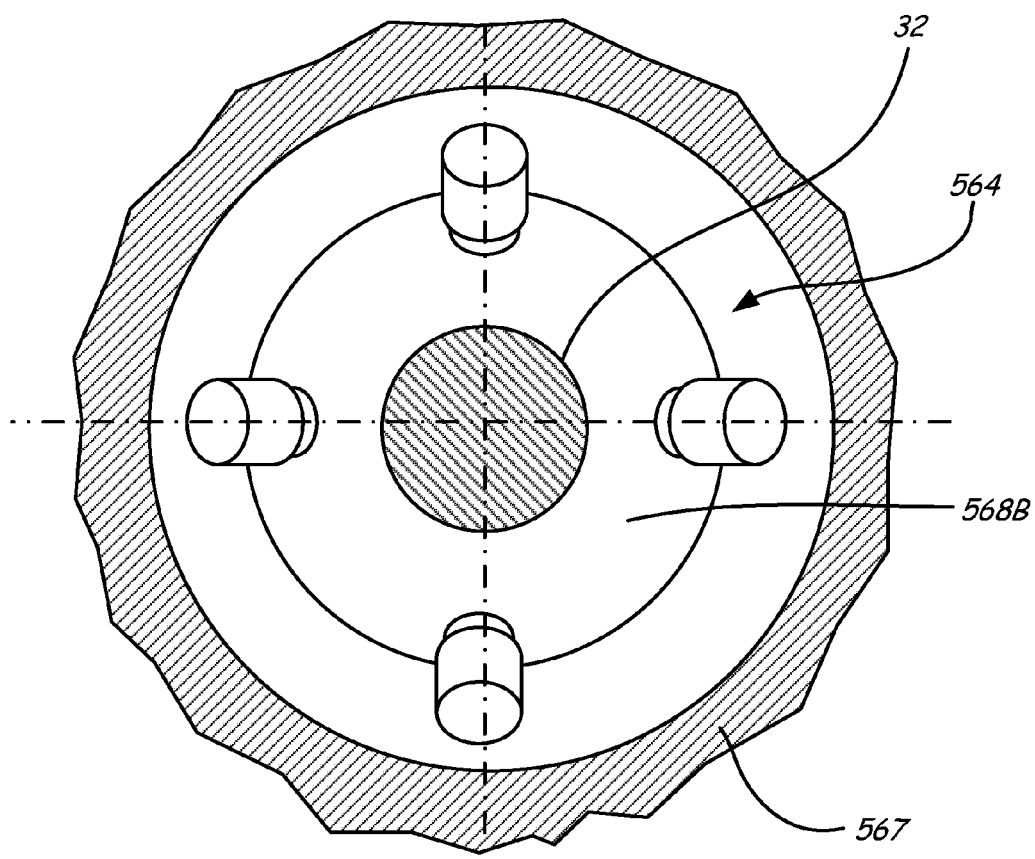
FIG. 22B is a sectional view of the test assembly taken along lines 22B-22B in FIG. 22A.
Figure 22C:
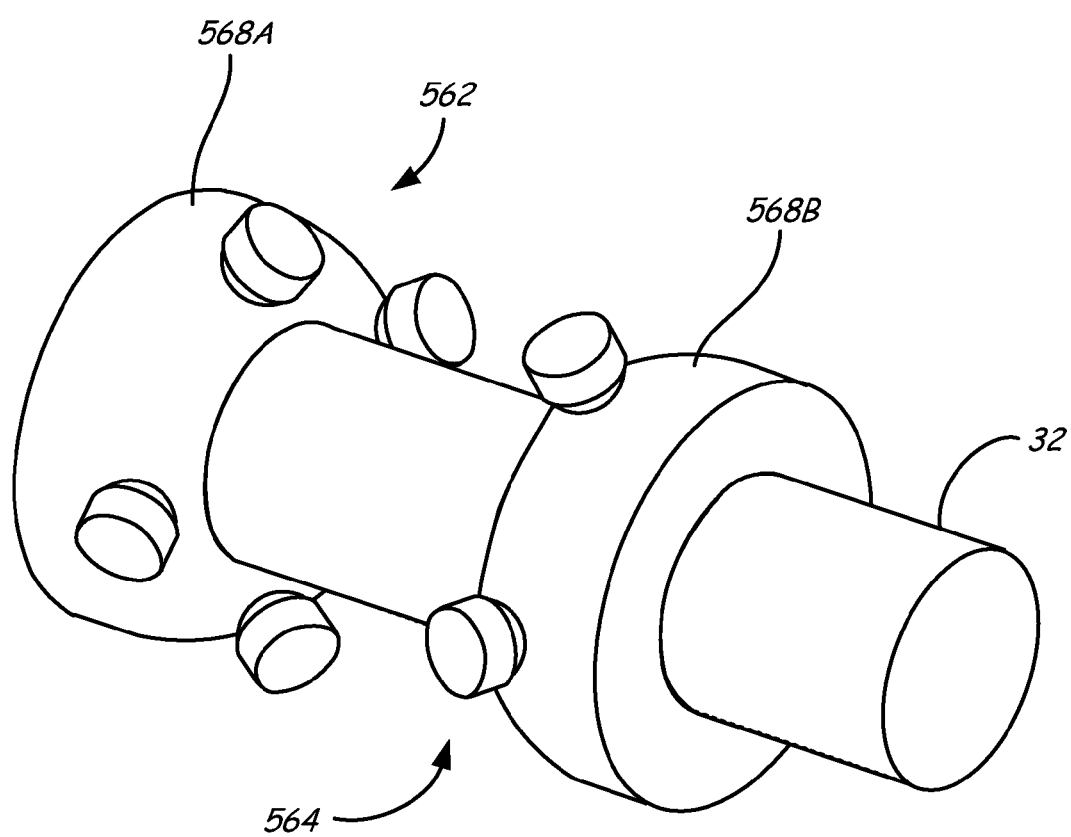
FIG. 22C is a perspective view of the test assembly of FIG. 22A with portions removed.
Figure 23A:
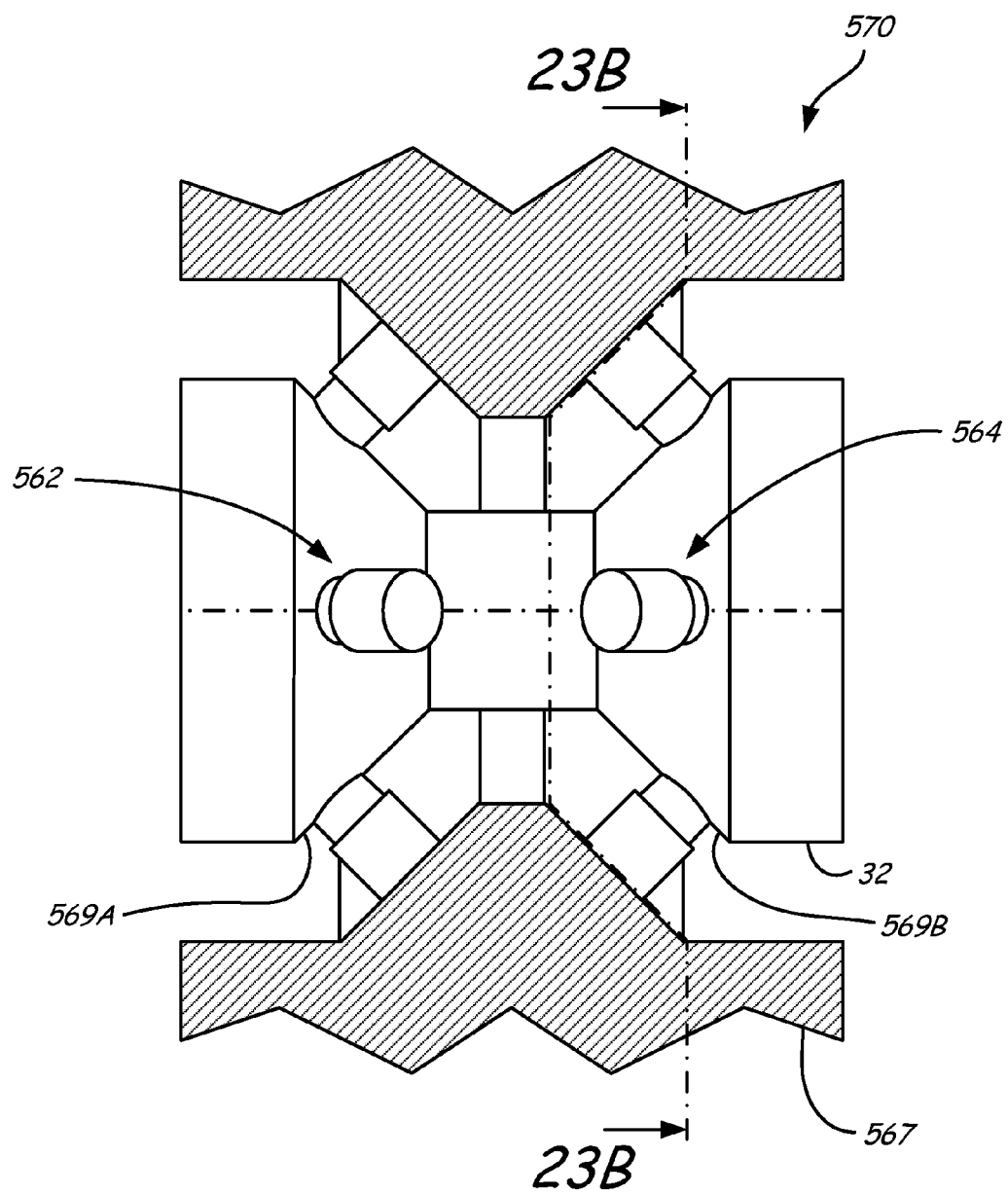
FIG. 23A is a schematic illustration of another test assembly.
Figure 23B:
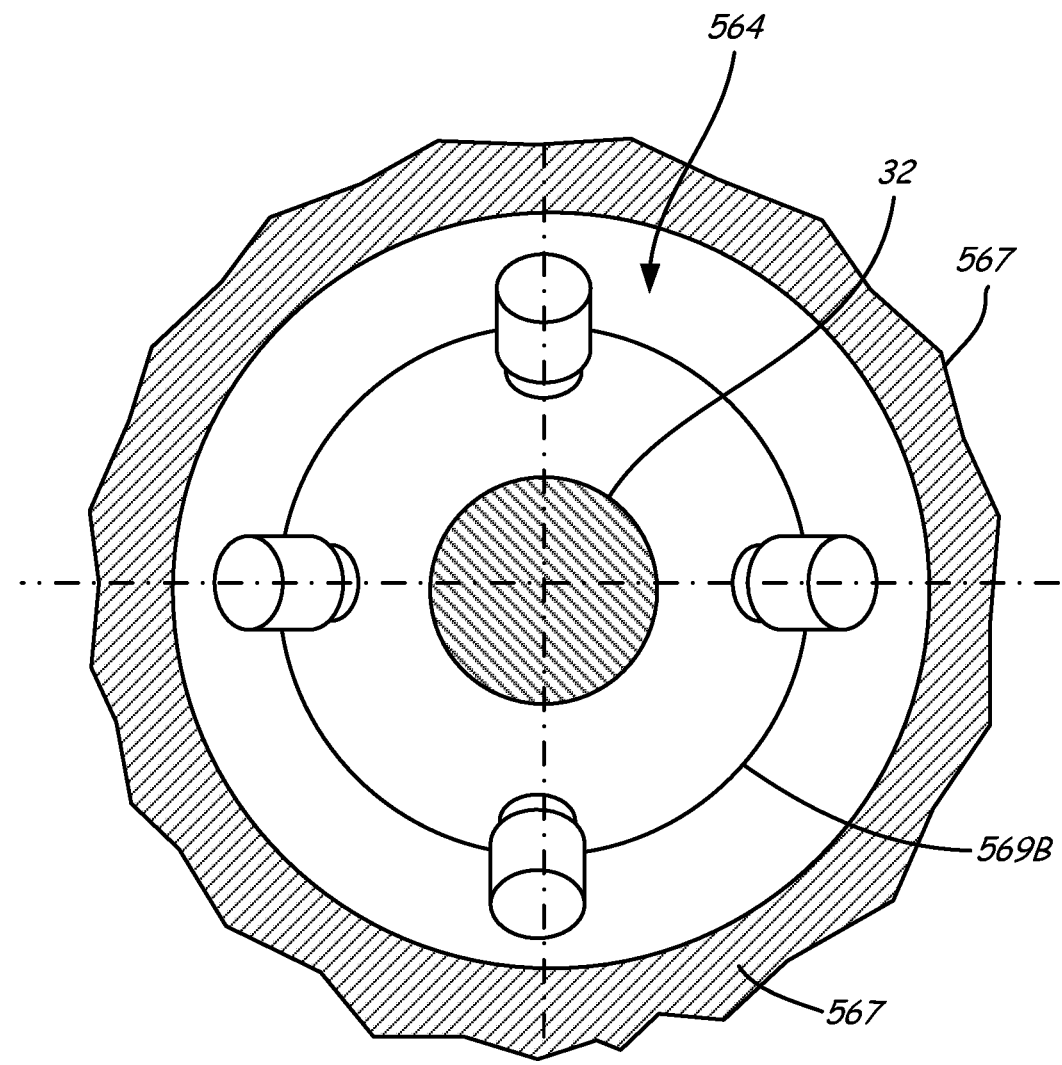
FIG. 23B is a sectional view of the test assembly taken along lines 23B-23B in FIG. 23A.
Figure 23C:
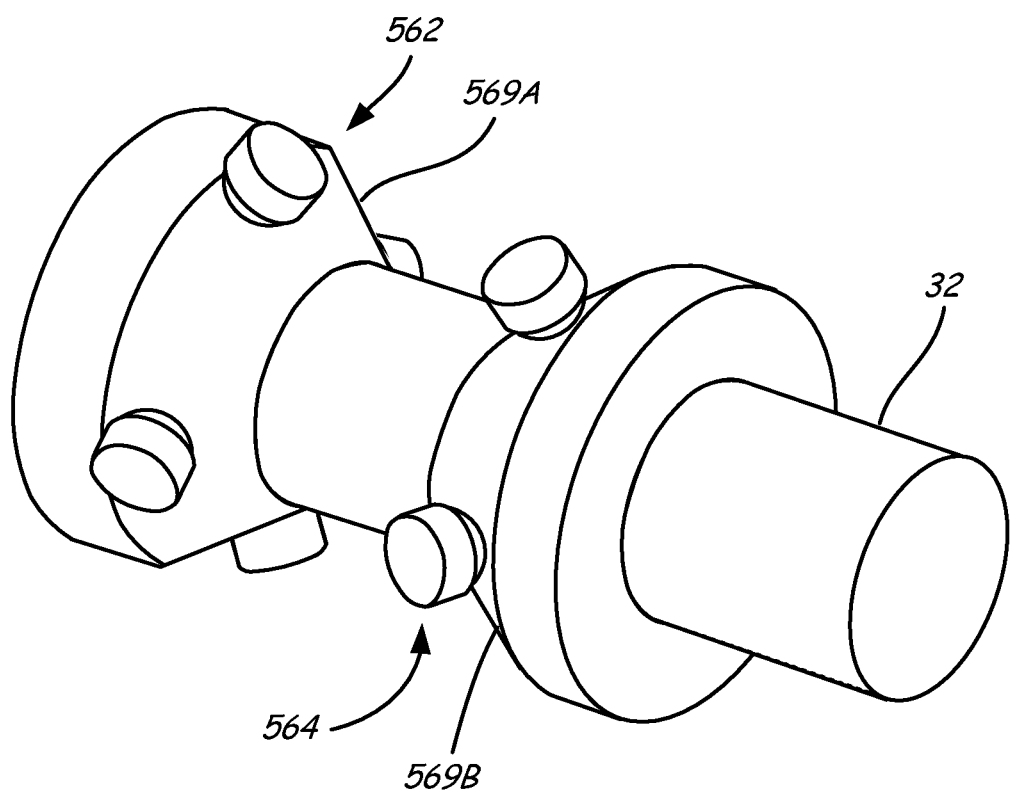
FIG. 23C is a perspective view of the test assembly of FIG. 23A with portions removed.

The actuator assemblies 560 and 570 of FIGS. 22A-22C and FIGS. 23A-23C, respectively, each include two pluralities of hydraulic (e.g. hydrostatic) bearing assemblies 562 and 564 wherein each of the individual hydraulic bearing assemblies of the pluralities 562 and 564 is configured or oriented so as to impart a load that is oblique to the rotational axis of the shaft 32. Generally, the plurality of hydraulic bearing assemblies 562 engage an annular surface 568A generally facing an annular surface 568B upon which the plurality of hydraulic bearing assemblies 564 engage. In the embodiment of FIGS. 22A-22C each of the surfaces 568A and 568B have curved or rounded conical surfaces (curved or rounded particularly when viewed in cross-section taken along the axis of rotation of shaft 32), while surfaces 569A and 569B are conical having relatively straight surfaces in cross-section taken along the axis of rotation of shaft 32. Each of the hydraulic bearing assemblies 562 and 564 contact a surface portion of each corresponding annular surface that can be considered oblique to the rotational axis of shaft 32. A suitable support structure 567 is provided as a reaction structure for each of the hydraulic bearing assemblies (omitted in FIGS. 22C and 23C for purposes of showing each of the plurality of hydraulic bearing assemblies 562, 564). An advantage of the embodiments of FIGS. 22A-22C and FIGS. 23A-23C is the reduced number of hydraulic bearing assemblies (herein by way of example eight in total) that are necessary to provide loads and/or displacements of shaft 32 in 5 degrees of freedom.

Figure 24A:
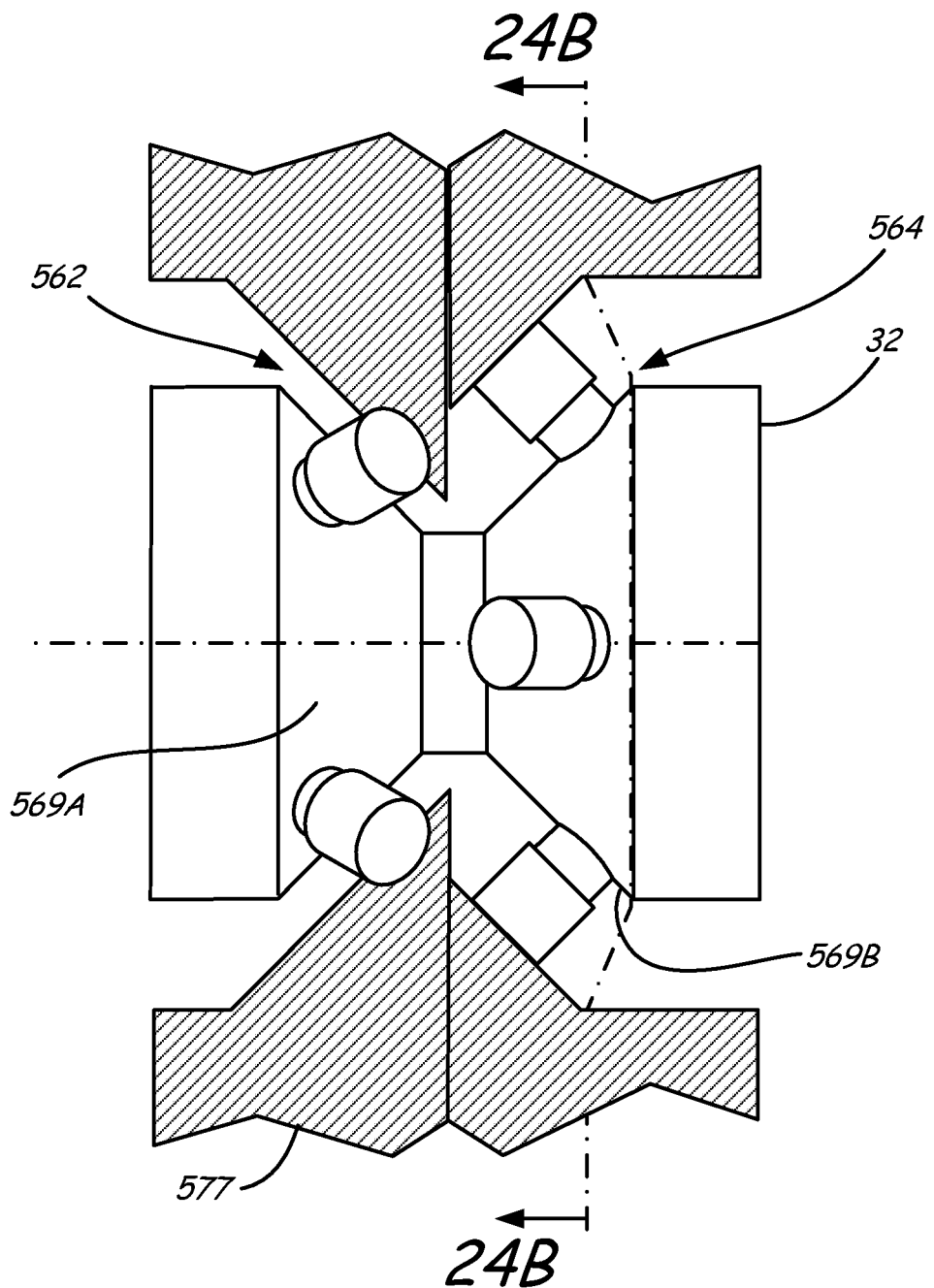
FIG. 24A is a schematic illustration of another test assembly.
Figure 24B:
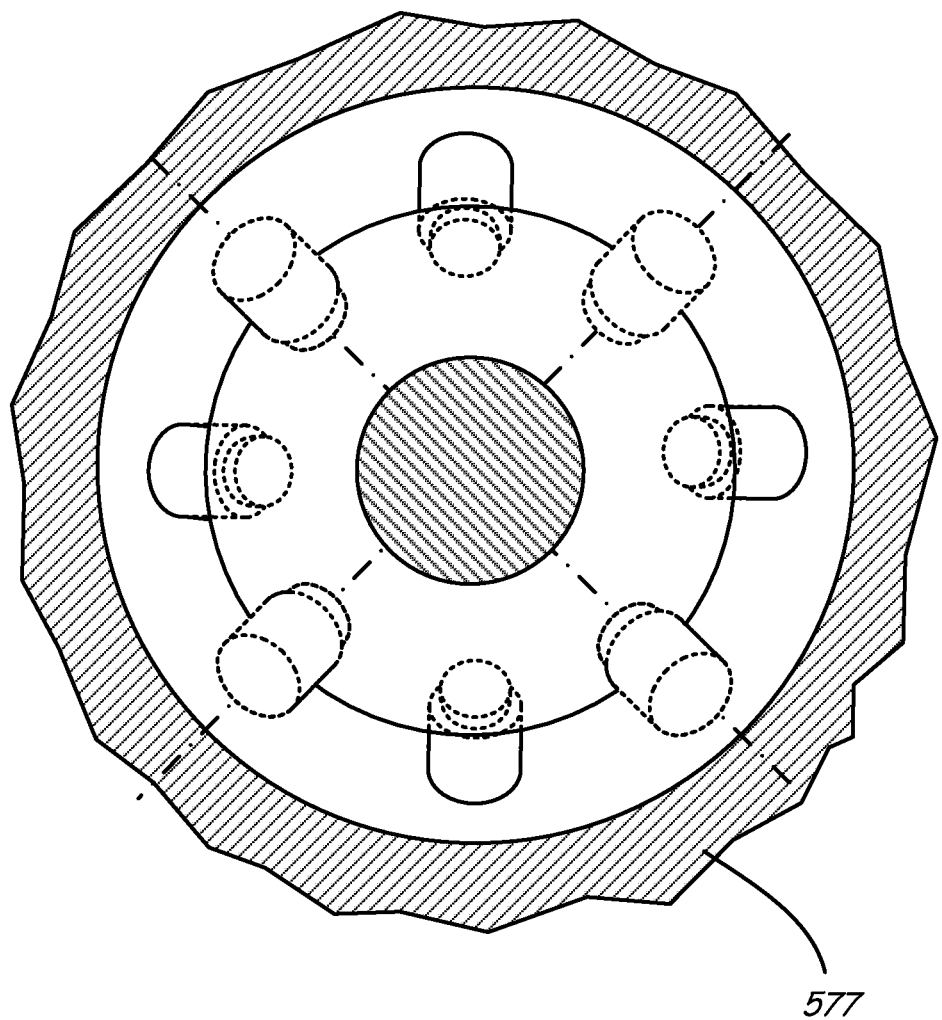
FIG. 24B is a sectional view of the test assembly taken along lines 24B-24B in FIG. 24A.
Figure 24C:
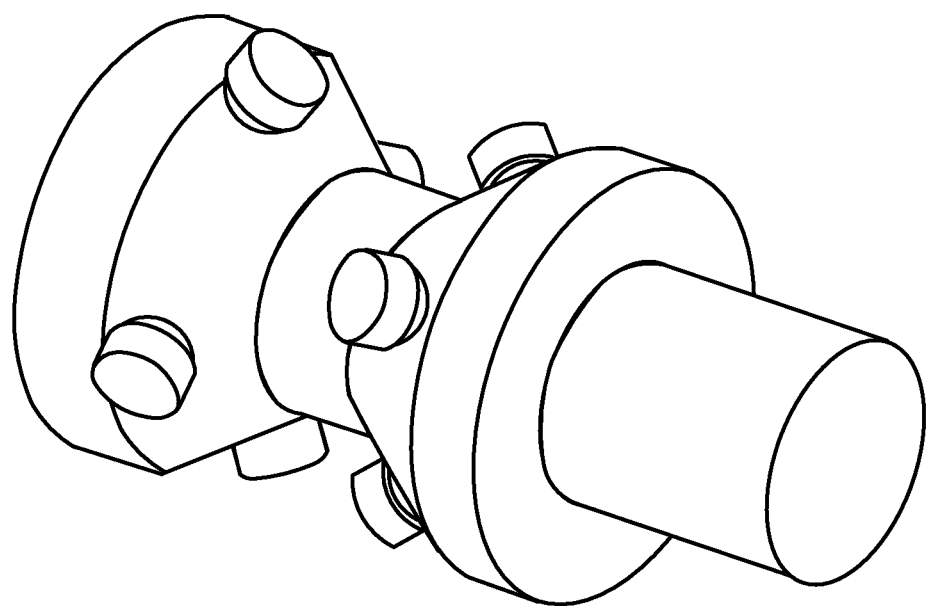
FIG. 24C is a perspective view of the test assembly of FIG. 24A with portions removed.
Figure 25:
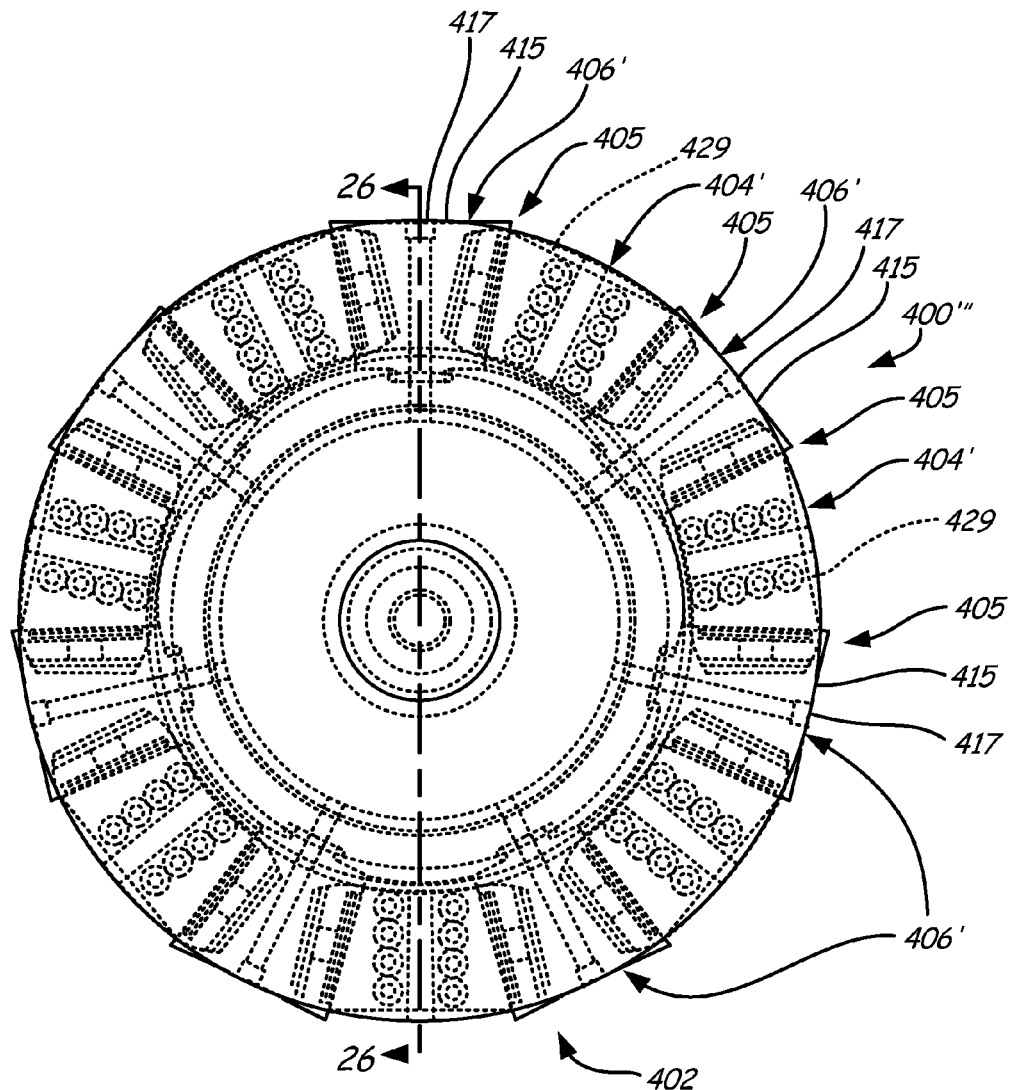
FIG. 25 is an end view of another torque transfer coupling.

In the embodiment of FIGS. 24A-24C, the hydraulic bearing assemblies of the plurality 564 are displaced as a set, such as by 45 degrees, relative to the hydraulic bearing assemblies of the plurality 562. In this manner, the surfaces 568A and 569B can be disposed axially closer together to form a more compact assembly. A suitable support structure 577 is provided as a reaction structure for each of the hydraulic bearing assemblies (omitted in FIGS. 22C and 23C for purposes of showing each of the plurality of hydraulic bearing assemblies 562, 564). Elements or portions of the hydraulic bearing assemblies of pluralities 562 and 564 may even overlap each other when viewed in a cross-section taken along the axis of rotation of shaft 32. Such a technique can be used if desired in any of the actuator assemblies herein discussed.

It should be noted that each plurality of hydraulic bearing assemblies 552, 554, 562 and 564 typically comprises three or more. In addition, although illustrated where the surfaces 558A and 558B, 568A and 568B, and 569A and 569B generally face each other, it should be understood the surfaces can be oriented so as to generally face away from each other, if desired, where the plurality of hydraulic bearing assemblies 552, 554, 562 and 564 are then arranged to accordingly.

The torque transfer couplings herein described are useful in transferring torque and other loads while allowing movement of assemblies connected to opposite ends thereof. Therefore, it should be understood the torque transfer couplings herein described are not limited to wind turbine testing, which is provided herein as an exemplary application.

Figure 5:
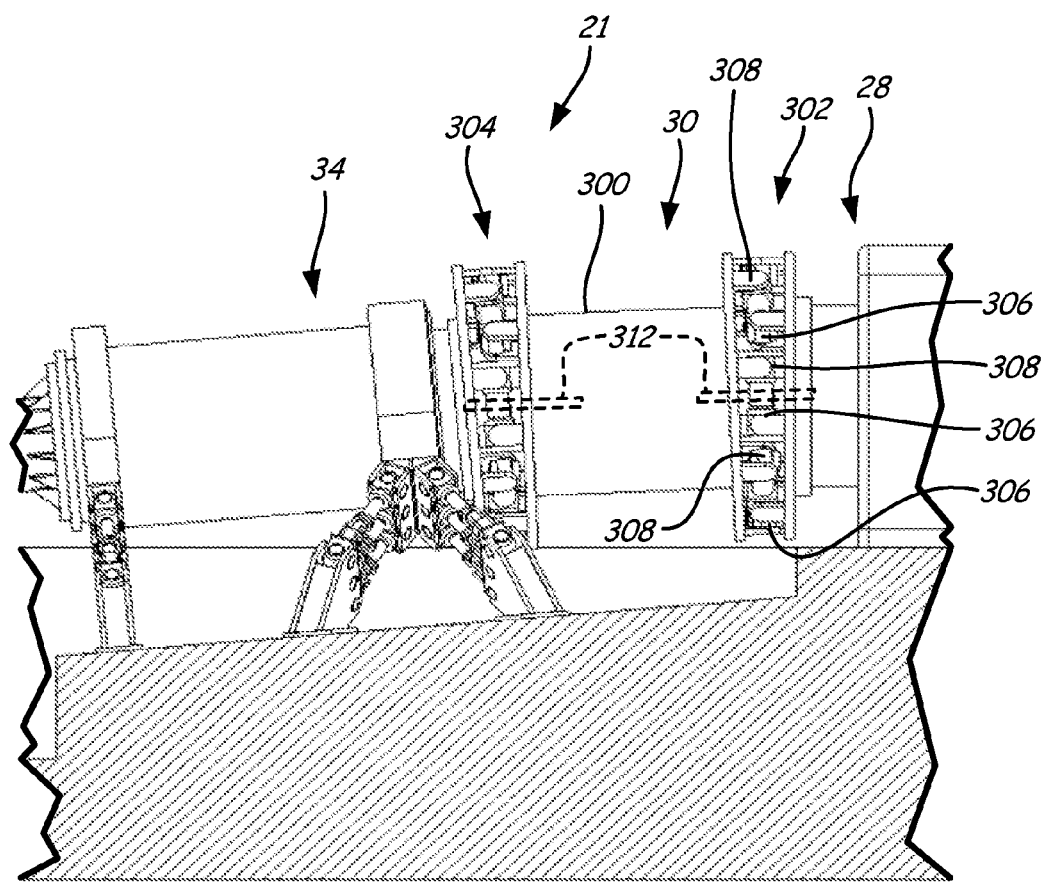
FIG. 5 is an elevational view of a portion of the test assembly of FIG. 2.

As indicated above, the torque transfer coupling 30 probably best illustrated in FIG. 5 transfers drive torque from the prime mover 28 to the actuator assembly 34, while still allowing movement of the actuator assembly 34 and/or wind turbine assembly 22. In the embodiment illustrated, the torque transfer coupling 30 includes a shaft, e.g. solid or tubular, herein a tube 300 (hereinafter "torque tube") and two sets of circumferentially arranged hydraulic devices, which can include piston and cylinder assemblies where extension and retraction of each piston generally is tangential to a portion of a circle encircling the torque tube 300. In coupling 30, the hydraulic devices comprise double acting actuators. A first set of actuators 302 connects the torque tube 300 to the prime mover 28 and a second set of actuators 304 connects the torque tube 300 to an actuator assembly such as any of the actuator assemblies herein discussed. Referring to the first set of double acting actuators 302, each actuator has a first end 306, such as a piston rod, pivotally joined to the prime mover 28, while a second end 308 of each actuator, such as the cylinder assembly, is pivotally joined to the torque tube 300. If desired, connection of the piston rod and cylinder assemblies to the prime mover 28 and torque tube can be reversed. The actuators 302 are circumferentially disposed about the axis of rotation of the torque tube 300 in manner such that extension and retraction of the piston rod of each actuator relative to its corresponding cylinder is generally tangential to a portion of a circle encircling the torque tube 300. The second set of actuators 304 is connected to torque tube 300 and actuator assembly 34 and 200 in a manner similar to the first set of actuators 302. In the exemplary embodiment, the actuators in sets 302 and 304 are operated from controller 80 and hydraulic power source 83 (although a separate controller and/or hydraulic power source can be provided if desired) so as to extend and retract in a manner as necessary while rotating with torque tube 300 such that compensation is provided that allows the axis of rotation of torque tube 300 to be displaced, if necessary, from the axes of rotation of input shaft 32 and/or the prime mover 28. Hydraulic slip ring(s) not shown can be provided to provide hydraulic fluid to each of the actuators in sets 302 and 304. Pressure sensors (not shown) can also be provided and operably coupled to measure operating pressures of some or all of the actuators in set 302 and/or set 304, wherein output signals from the pressure sensors can then be provided to controller 80 and used to ascertain the applied torque $M_X$. The extension and retraction of some or all of the actuators in sets 302 and 304 can be monitored with sensors and provided as inputs to controller 80, if desired. Likewise, linear and/or rotational position sensors can also be operably configured to sense the position of the input shaft 32, torque tube 300 and/or shaft of the wind turbine under test in one, some or all degrees of freedom and provide position signals to the controller 80 during operation.

The torque transfer coupling 30 will be nominally controlled such that the rotational position of the shaft 32 and shaft of the wind turbine assembly under test are maintained at a desired angle relative to one another, which may be static or which may vary in time. However, torsional systems often have difficulties due to resonances that are directly affected by the stiffness and damping characteristics of the coupling. Since the torque transfer coupling 30 is actively controlled, it is possible to command the hydraulic devices of the torque transfer coupling 30 in such a manner as to add additional stiffness or damping to the torque transfer coupling 300.

By manual or automatic analysis, the system dynamics can be used to determine whether additional stiffness and/or damping would be a benefit. Likewise, controller 80 can use a compensation signal or parameter to achieve the desired stiffness or damping. For instance, from suitable sensors (e.g. torque cells, pressure sensors or the like), a compensation signal or parameter can be computed from the measured or ascertained input torque versus the torque desired. This signal or parameter can be used as a basis alone or in part for operating the power source 83 so as to control the hydraulic devices 302 and 304 accordingly so as to command relative motion between the various shafts of the torque transfer coupling 30 such that the coupling and/or shaft dynamic characteristics change as desired. An example of such a compensation signal is a damping term which, in the presence of a sinusoidal torque input, would have a phase lag of 90° with respect to the torque signal and would thereby add damping to the dynamic system. Various combinations of damping and stiffness terms are possible both for sinusoidal and non-sinusoidal input torques.

It should also be noted that the actuators in each set 302 and 304 can be connected together hydraulically to minimize hydraulic flow requirements.

Figure 12:
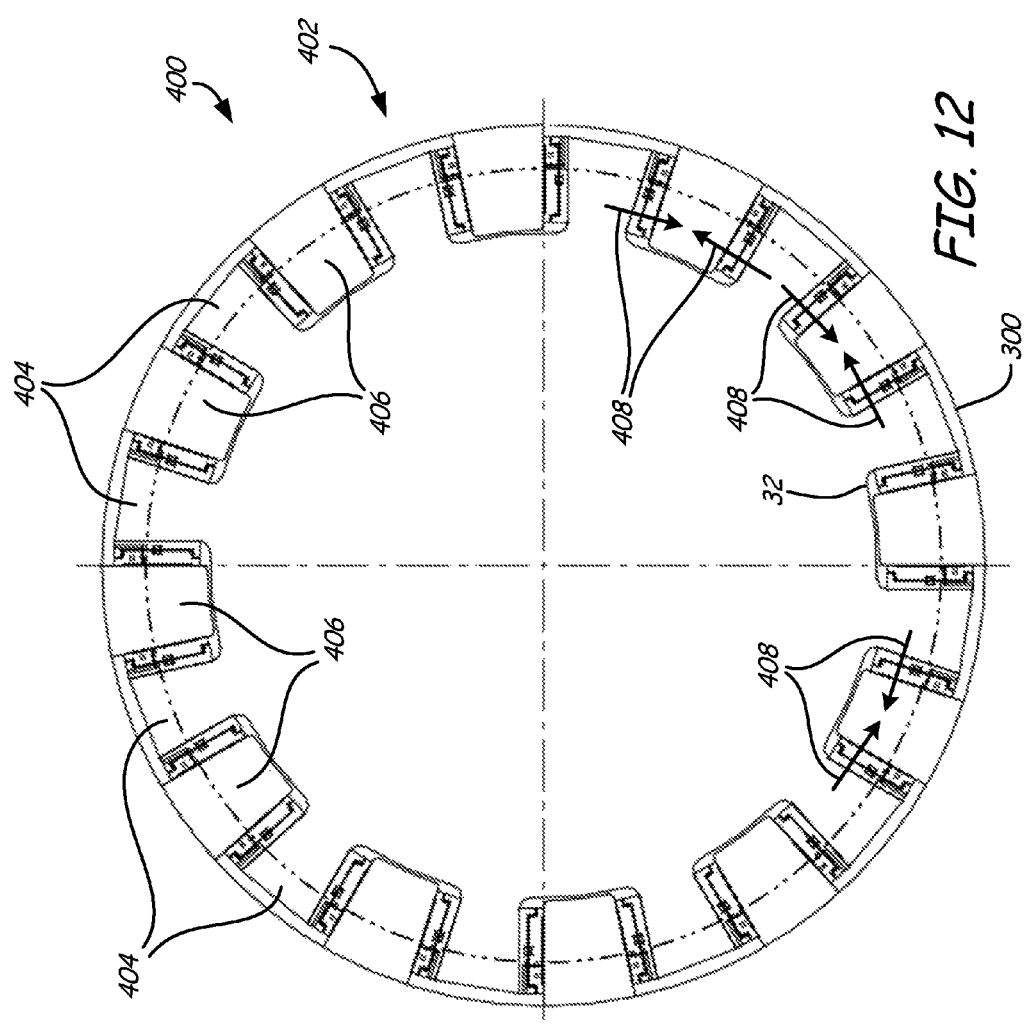
FIG. 12 is a schematic illustration of a torque transfer coupling.

Although the control system components and operation thereof has been described with respect to torque transfer coupling 30, it should be noted the control system and operation thereof can be used with any of the torque transfer couplings herein described FIG. 12 illustrates a portion of another torque transfer coupling 400 also comprising circumferentially arranged sets of hydraulic devices, one set at each end of torque tube 300, wherein each hydraulic device can include a piston and cylinder assembly and wherein extension and retraction of each piston is generally tangential to a portion of a circle encircling the torque tube 300.

By way of example in FIG. 12 the hydraulic devices 402 couple torque tube 300 to actuator assembly 34 (input shaft 32); however, it should be understood a second set of similar hydraulic devices can be provided to couple the torque tube 300 to primer mover 28. As illustrated, the input shaft 32 and the torque tube 300 include axially oriented projections (dogs) that overlap each other in the axial direction of torque tube 300. Specifically, projections 404 are rigidly joined to or are a part of input shaft 32, while projections 406 are rigidly joined to or are a part of tube 300. The hydraulic devices 402 are arranged such that a hydraulic device is interposed between each pair of overlapping projections 404 and 406.

Each hydraulic device can comprise a hydrostatic bearing element assembly (similar to bearing element assemblies 44) having a pad supporting the associated projection via a thin film of fluid as described above. (It should be understood the other types of bearings described above can also be used). In a further embodiment, the piston/cylinder assemblies of each pair of hydraulic devices are oriented between each pair of projections 404 and 406 so as to operate (extend and retract) in opposite directions. In FIG. 12, arrows 408 represent extension of each piston of each corresponding hydraulic device. In this manner, one set (every other hydraulic device circumferentially about tube 300) react positive torque about tube 300, while a second set (the hydraulic devices interposed between the hydraulic devices of the first set) react negative torque about tube 300. Like the actuators of torque transfer coupling 30, the hydraulic devices 402 of torque transfer coupling 400 can be individually controlled and/or can be connected together hydraulically minimize hydraulic flow requirements.

Referring back to FIGS. 5A and 5B, torque transfer couplings 400' and 400" are illustrated and are similar in construction and function to torque transfer coupling 400. In transfer couplings 400' and 400", overlapping projections 404' and 406' are present where each projection 406' is disposed in a slot 405 and where the material between the successive slots 405 form each of the projections 404'. In the embodiment of FIGS. 5A and 5B, hydraulic devices 402 (e.g. hydrostatic bearings) are configured as a plurality (herein by example two) of parallel operating actuators 407 (FIG. 5B) between each of the projections 404' and 406'.

Figure 26:
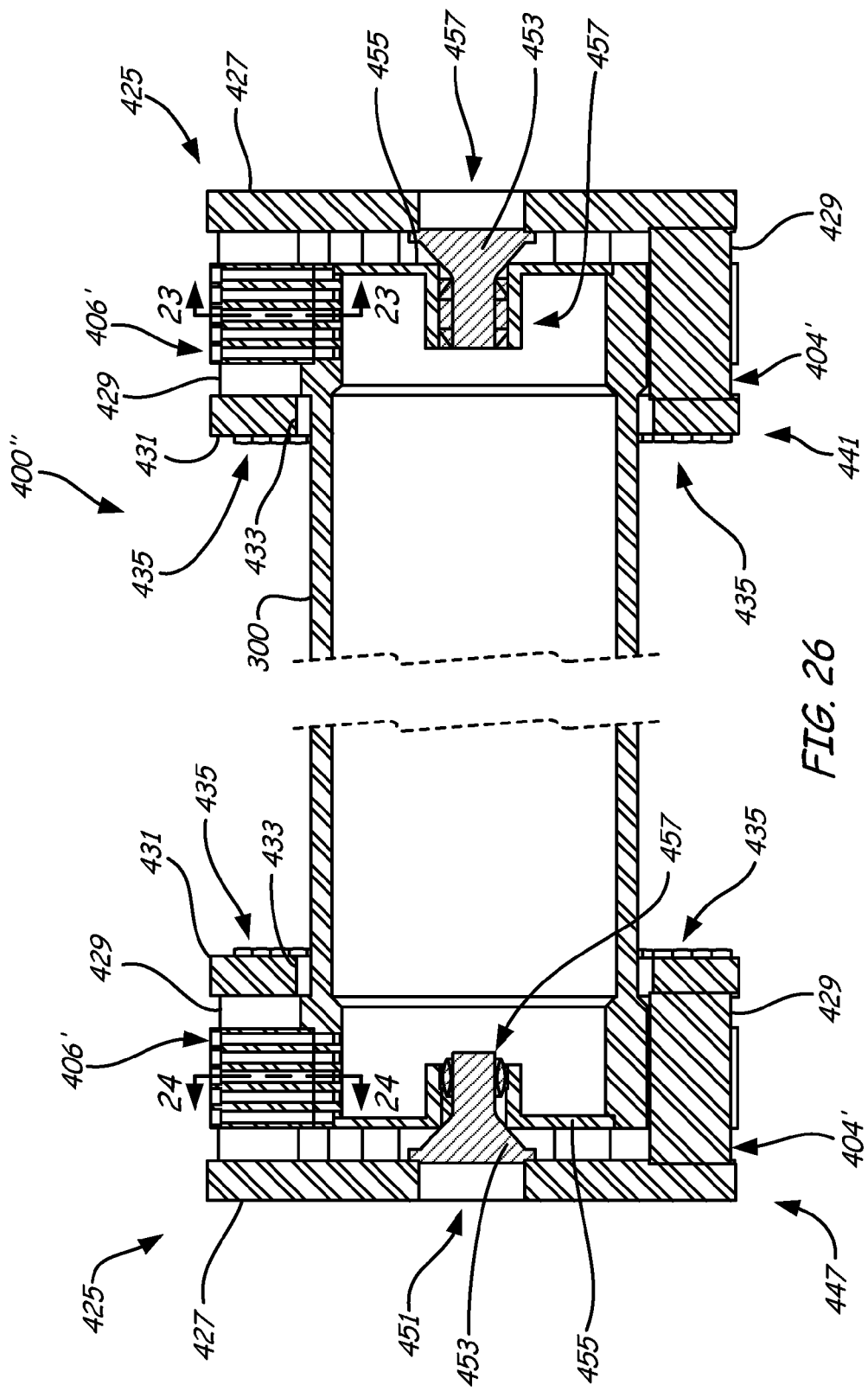
FIG. 26 is a sectional view of the torque transfer coupling taken along lines 26—26 in FIG. 25.
Figure 27:
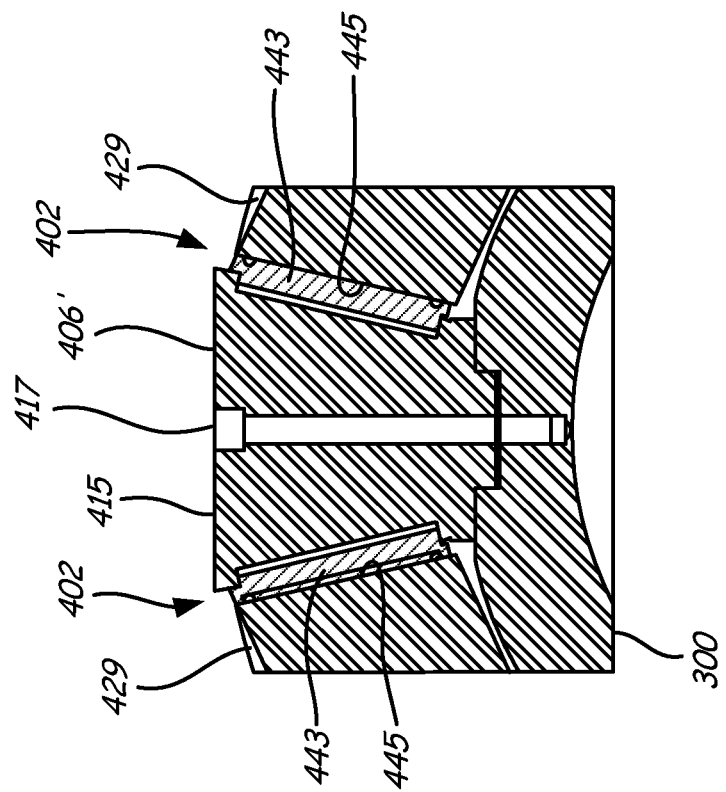
FIG. 27 is an enlarged sectional view of a portion of the torque transfer coupling of FIG. 25.
Figure 28:
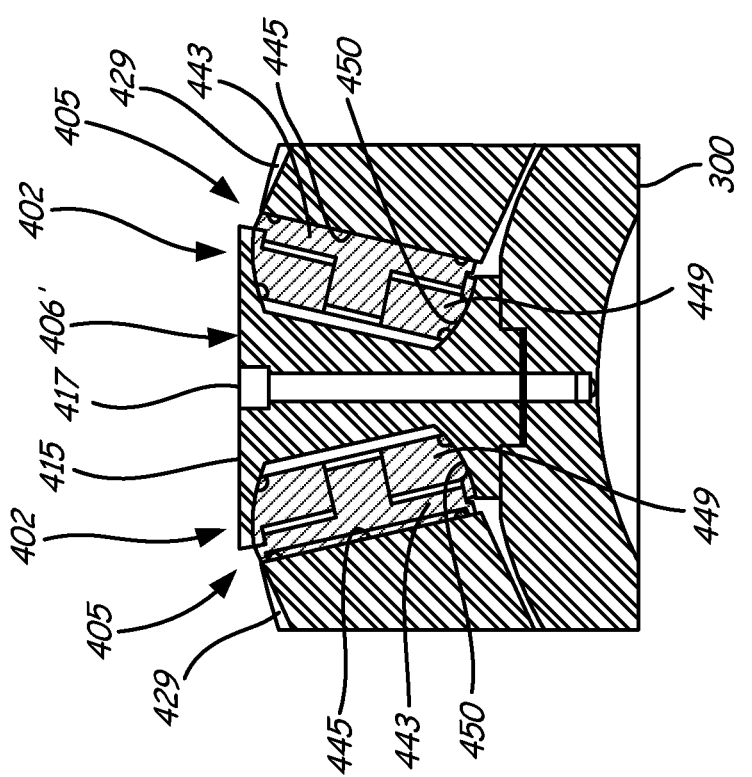
FIG. 28 is an enlarged sectional view of a portion of the torque transfer coupling of FIG. 25.

FIGS. 25-28 illustrate yet another torque transfer coupling 400''' similar in construction and function to torque transfer couplings 400, 400' and 400". As in the previously discussed embodiments overlapping projections 404' and 406' are present where each projection 406' is disposed in a slot 405. In this embodiment, projections 406' comprise block members 415 secured to tube 300 (herein using fasteners 417), while projections 404' form collar assemblies 425 at each end of the tube 300, the collar assemblies 425 being fixedly connected to the input shaft 32 at one end and to the prime mover 28 at the other end. Generally, each collar assembly 425 includes a mounting plate 427, spacers 429 and a ring plate 431. Ring plate 431 includes an aperture 433 through which tube 300 extends when each of the block members 415 are disposed in a corresponding slot 405 formed by spacers 429. Fasteners 435 secure the ring plate 431 and spacers 429 to the mounting plate 427. In a manner, similar to transfer couplings 400' and 400", generally hydraulic devices 402 (e.g. hydrostatic bearings) are disposed between the block members 415 and spacers 429 so as to react positive and negative torque and allow movement of the collar assemblies 425 relative to tube 300. In FIG. 27, which corresponds to collar assembly 425 on end 441 of tube 300, the hydraulic devices 402 comprise piston/cylinder assemblies similar to transfer couplings 400' and 400" where each piston 443 slides upon a flat bearing surface 445. However, in FIG. 28, which corresponds to collar assembly 425 on end 447 of tube 300, the hydraulic devices 402 comprise piston/cylinder assemblies that provide increased angular movement between the collar assembly 425 and tube 300. Although the piston 443 slides upon a flat bearing surface 445, the cylinder that is pressurized for the piston 443 is formed in a socket member 449 that can move relative to block member 415 in a socket 450. For instance, socket member 449 can form a hydraulic bearing (e.g. hydrostatic bearing) with respect to socket 450 in block member 415.

Another torque transfer coupling is illustrated in FIGS. 15, 16, 19 and 20 at 600 having bearing elements disposed about an axis of the shaft. Torque transfer coupling 600 includes beams 602 and 604. Beam 602 can be coupled to input shaft 32 to rotate therewith, while beam 604 can be coupled to a prime mover or a shaft of the turbine under test. Each beam 602,604 includes support structures 605 at each end. Disposed between beams 602,604 is a cruciform or intermediate member 606. The cruciform 606 includes four support structures 607 spaced about an axis of rotation at equal angular intervals. As illustrated, the support structures 607 of the cruciform 606 cooperate with the support structures 605 of the beams 602, 604 to least partially restrain the (i.e. for radial displacement of the cruciform 606 relative to the axis of rotation). In the embodiment illustrated, opposed hydraulic bearing assemblies 610 (e.g. hydrostatic assemblies) couple the support structures 607 of the cruciform 606 to the corresponding support structures 605 of each end of each respective beam 602, 604. In the embodiment illustrated, the support structures 605 of the beams 602, 604 comprise brackets with spaced-apart bracket flanges 612, while the support structures 607 of the cruciform 606 each comprise a projection with a projection surface 612 facing each bracket flange 610. A hydraulic bearing assembly 620 is disposed between each projection surface 612 and each corresponding bracket flange 610. It should be noted that the support structures 607 of the cruciform 606 can comprise spaced-apart bracket flanges, and the support structure 605 of each beam 602, 604 can include a projection with a projection surface facing each bracket flange. The hydraulic bearing assemblies 620 can be configured to provide two dimensional compliance by providing a thin film on surfaces of the bracket flanges 610 or the projection surfaces 612 in a manner similar to the hydraulic bearing assemblies described above. Relative two dimensional movement of the bracket flanges 610 and corresponding projection surfaces 612 allows the axis of rotation of the beam 602 to be at an angle or otherwise offset relative to the axis of rotation of the beam 604 while still effectively transferring torque through the coupling 600.

It should be noted that an additional mechanism such as pilot bearing(s), mechanical linkage and/or spring(s) (schematically indicated by element 312 in FIG. 5) can be provided to couple the torque tube 300 and actuator assembly 34 and/or prime mover 28 axially together so as to provide axial restraint for torque tube 300 or for any of torque transfer couplings 30, 400, 400', 400" or 600. Exemplary pilot bearings are illustrated in FIG. 26 at 451. In this embodiment, a spindle 453 is secured to each mounting plate 427, while a plate member 455 is secured to each end of tube 300. A bearing assembly 457 operably couples the spindle 453 to the plate member 455 so as to provide axial restraint but includes cooperating bearing elements that allow the desired tilting movement of the collar assembly 425 relative to the tube 300.

It should be noted that the axial restraint is typically provided on only one coupling, while the other is free axially. The pilot bearings also serve to fix the XY (lateral and vertical) motion of the shaft portions on each coupling. While this mechanism is not required for all embodiments herein described, in its absence, additional control channels may be needed to hold the centerlines of the shaft portions at a fixed position relative to one another.

Figure 29:
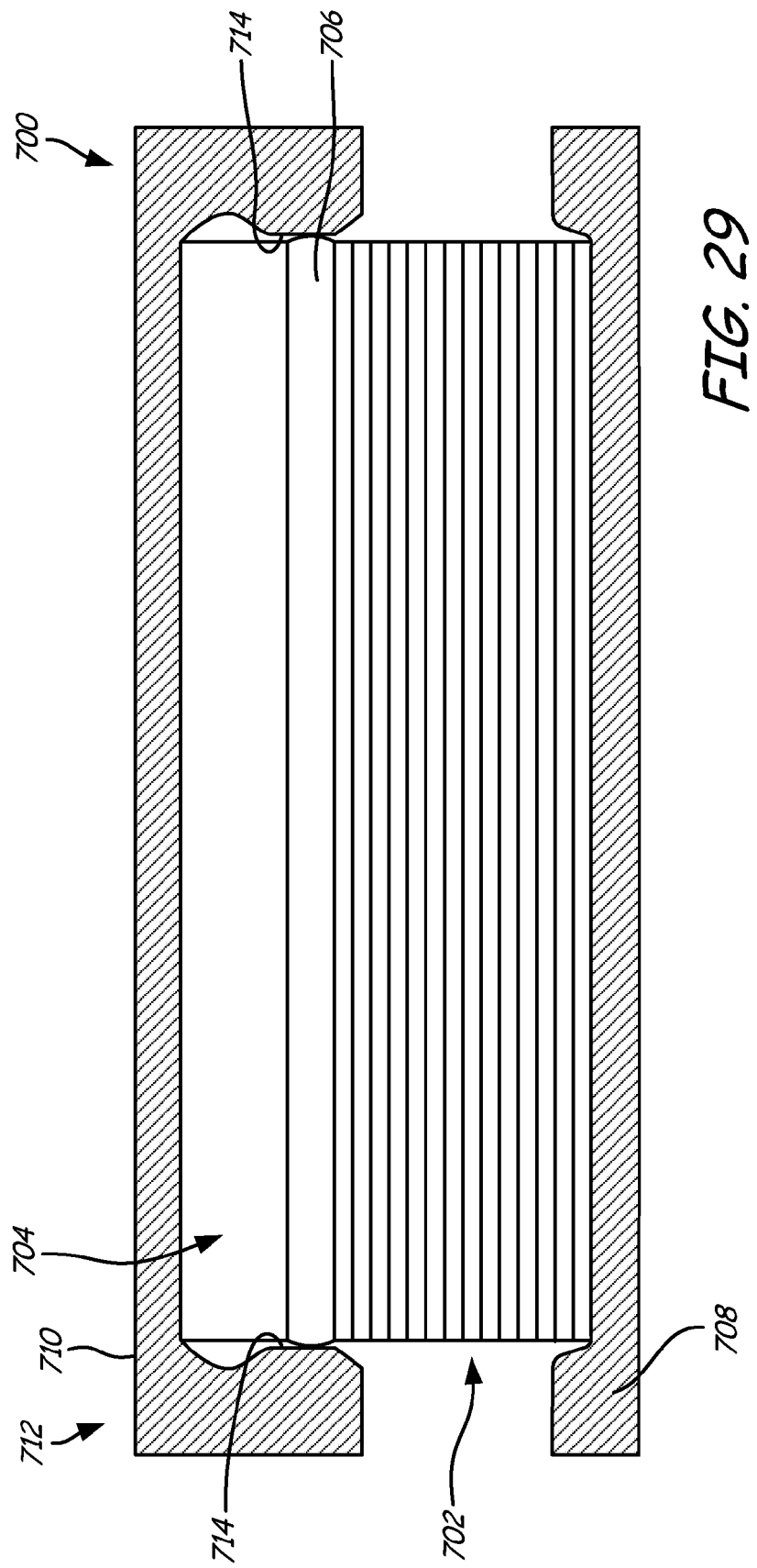
FIG. 29 is a schematic illustration of an elastomeric bearing.

FIG. 29 illustrates an elastomeric bearing 700 that can be used in place of the hydraulic devices in the torque transfer couplings described above. Generally, the elastomeric bearing 700 comprises a first portion 702 comprising alternating layers of relatively thin layers of elastomeric material and rigid plates bonded or laminated together. As used herein "thin" is defined as a layer of thickness of the elastomeric material that is not substantially extruded from portion 702 or otherwise damaged under the compressive load requirements that the elastomeric bearing 700 is expected to carry. The first portion 702 provides the elastomeric bearing 700 with shear compliance.

The second portion 704 is secured to the first portion 702 with a rigid support plate 706. The second portion 704 comprises a thicker layer of elastomeric material (thick enough so as to allow relative pivotal movement between support surface 708 and 710). The second portion 704 is disposed in a recess or otherwise is annularly surrounded by walls 714 of a housing or mount 712, the inner surfaces of the walls 714 of which slidably engage the rigid support plate 706. As indicated above, the elastomeric material of the bearing 700 can be compressed or otherwise deformed in the presence of compressive loads upon the bearing 700. The type of elastomeric material and its thickness in portion 704 are selected such that when the bearing 700 is compressed, the elastomeric material in portion 704 extrudes to engage the surfaces of the walls 714, possibly filling an annular recess 718 if provided. Particularly in this state, the second portion is compliant for bending motions allowing relative pivotal motion between support surfaces 208, 210. It should be noted the shape of the portions 702, 704, housing 712 can take any convenient form such as but not limited to cylindrical or rectangular forms.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A torque transfer coupling comprising:
   a shaft; and
   a first set of hydraulic devices, each hydraulic device of the first set of hydraulic devices having a first end operably connected to a first end of the shaft, wherein the first ends of the first set of hydraulic devices are circumferentially disposed about an axis of rotation of the shaft in a spaced apart manner, and wherein each hydraulic device of the first set of hydraulic devices includes a piston and cylinder assembly wherein extension and retraction of each piston of each hydraulic device of the first set of hydraulic devices is generally tangential to a portion of a first circle encircling the shaft, each hydraulic device being oriented and connected to the shaft to apply torque to the shaft about the axis of rotation.

2. The torque transfer coupling of claim 1 and further comprising a second set of hydraulic devices, each hydraulic device of the second set of hydraulic devices having a first end operably connected to a second end of the shaft, wherein the first ends of the second set of hydraulic devices are circumferential disposed about the axis of rotation of the shaft in a spaced apart manner, and wherein each hydraulic device of the second set of hydraulic devices includes a piston and cylinder assembly wherein extension and retraction of each piston of each hydraulic device of the second set of hydraulic devices is generally tangential to a portion of a second circle encircling the shaft and applies torque to the shaft about the axis of rotation.

3. The torque transfer coupling of claim 2 and further comprising a first member coupled to the first end of the shaft and a second member coupled to the second end of the shaft, wherein each of an end of the first member, an end of the second member, the first end of the shaft and the second end of the shaft include axially extending surfaces disposed circumferentially about a respective axis of rotation, wherein the surfaces of the first end of the shaft are disposed between surfaces of the first member and wherein each hydraulic device of the first set of hydraulic devices is disposed between opposed facing surfaces of the first member and the first end of the input shaft, and wherein the surfaces of the second end of the shaft are disposed between surfaces of the second member and wherein each hydraulic device of the second set of hydraulic devices is disposed between opposed facing surfaces of the second member and the second end of the input shaft.

4. The torque transfer coupling of claim 1 and further comprising a first member coupled to the first end of the shaft, wherein each of an end of the first member and the first end of the shaft include axially extending surfaces disposed circumferentially about a respective axis of rotation, wherein the surfaces of the first end of the shaft are disposed between surfaces of the first member and wherein each hydraulic device of the first set of hydraulic devices is disposed between opposed facing surfaces of the first member and the first end of the input shaft.

5. The torque transfer coupling of claim 4 wherein axially extending surfaces are formed from slots disposed circumferentially about one of the first end of the shaft and the end of the first member.

6. The torque transfer coupling of claim 4 wherein each of the hydraulic devices comprise a hydraulic bearing assembly.

7. The torque transfer coupling of claim 6 wherein each of the hydraulic devices is single acting having extension under pressure in one direction.

8. The torque transfer coupling of claim 2 wherein successive hydraulic devices of each of the first set of hydraulic devices and the second set of hydraulic devices operate in opposed directions.

9. The torque transfer coupling of claim 1 wherein each of the hydraulic devices is single acting having extension under pressure in one direction.

10. The torque transfer coupling of claim 1 wherein each of the hydraulic devices is double acting having extension and retraction under pressure in opposed directions.

11. The torque transfer coupling of claim 2 wherein each of the hydraulic devices is single acting having extension under pressure in one direction.

12. The torque transfer coupling of claim 4 wherein successive hydraulic devices of each of the first set of hydraulic devices operate in opposed directions.

13. The torque transfer coupling of claim 4 and further comprising an element configured to limit axial displacement of the first end of the shaft from the end of the first member.

14. The torque transfer coupling of claim 1 and further comprising:
a power source configured to provide fluid to operate each of the hydraulic devices; and
a controller configured to control the power source.

15. The torque transfer coupling of claim 14 wherein the controller is configured to operate the hydraulic devices to control stiffness and/or damping of the torque transfer coupling.

16. A method of transferring torque from a first element to a second element, comprising:
connecting a first set of hydraulic devices to the first element and a shaft, wherein each hydraulic device of the first set of hydraulic devices has a first end operably connected to a first end of the shaft and has a second end operably connected to the first element, wherein the first ends of the first set of hydraulic devices are circumferentially disposed about an axis of rotation of the shaft in a spaced apart manner, and wherein each hydraulic device of the first set of hydraulic devices includes a piston and cylinder assembly wherein extension and retraction of each piston of each hydraulic device of the first set of hydraulic devices is generally tangential to a portion of a first circle encircling the shaft and applies torque to the shaft about the axis of rotation; and
operating each of the hydraulic devices so as apply torque to the shaft about the axis of rotation and to transfer torque from the first element to the shaft.

17. The method of claim 16 wherein operating includes operating each of the hydraulic devices so as to transfer torque from the first element to the shaft while maintaining a selected orientation of an axis of rotation of the first element relative to the axis of rotation of the shaft.

18. The method of any one of claim 16 wherein operating includes operating each of the hydraulic devices so as to transfer torque from the first element to the shaft while controlling stiffness and/or damping.

19. The method of claim 16 and further comprising:
connecting a second set of hydraulic devices, each hydraulic device of the second set of hydraulic devices having a first end operably connected to a second end of the shaft, wherein the the first ends of the second set of hydraulic devices are circumferentially disposed about the axis of rotation of the shaft in a spaced apart manner, and wherein each hydraulic device of the second set of hydraulic devices includes a piston and cylinder assembly wherein extension and retraction of each piston of each hydraulic device of the second set of hydraulic devices is generally tangential to a portion of a second circle encircling the shaft and applies torque to the shaft about the axis of rotation; and
wherein operating includes operating each of the hydraulic devices so as apply torque to the shaft about the axis of rotation and to transfer torque from the first element to the second element.

20. The method of claim 19 wherein operating includes operating each of the hydraulic devices so as to transfer torque from the first element to the second element while maintaining a selected orientation of an axis of rotation of the first element relative to the axis of rotational of the shaft.

21. The method of any one of claim 20 wherein operating includes operating each of the hydraulic devices so as to transfer torque from the first element to the second element while controlling stiffness and/or damping.

22. The apparatus of claim 4 wherein each piston and each cylinder of each hydraulic device movably engage each corresponding surface upon which force from the hydraulic device is applied.

23. The apparatus of claim 22 wherein each piston and each cylinder of each hydraulic device movably engage each corresponding surface upon which force from the hydraulic device is applied.

24. The apparatus of claim 23 and further comprising a plurality of sockets each socket being fixedly coupled to one of the shaft or the first element, wherein each socket slidably receives a cylinder of one of the hydraulic devices.

25. The apparatus of claim 24 wherein each interface between each socket and corresponding cylinder comprise a hydraulic bearing.

26. A torque transfer coupling system comprising:
a shaft; and
a set of hydraulic devices, each hydraulic device of the first set of hydraulic devices having a first end operably connected to a first end of the shaft, wherein the first ends of the first set of hydraulic devices are spaced apart from each other and circumferentially disposed about an axis of rotation of the shaft, and wherein each hydraulic device of the first set of hydraulic devices includes a piston and cylinder assembly wherein extension and retraction of each piston of each hydraulic device of applies torque to the shaft about the axis of rotation; and a power source configured to provide fluid to operate each of the hydra devices; and a controller configured to control the power source.

* * * * *